US012613575B2

(12) United States Patent
Lutter et al.

(10) Patent No.: US 12,613,575 B2
(45) Date of Patent: Apr. 28, 2026

(54) SYSTEMS AND METHODS OF TRANSITIONING DISPLAY OF A THREE-DIMENSIONAL OBJECT BASED ON TILT

(71) Applicant: Apple Inc., Cupertino, CA (US)

(72) Inventors: Gregory Lutter, Boulder Creek, CA (US); Manuel C. Clement, Felton, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 18/522,953

(22) Filed: Nov. 29, 2023

(65) Prior Publication Data

US 2024/0192772 A1     Jun. 13, 2024

Related U.S. Application Data

(60) Provisional application No. 63/386,870, filed on Dec. 9, 2022.

(51) Int. Cl.
*G06F 3/01* (2006.01)
*G06F 3/04815* (2022.01)
(Continued)

(52) U.S. Cl.
CPC .......... *G06F 3/013* (2013.01); *G06F 3/04815* (2013.01); *G06F 3/0487* (2013.01);
(Continued)

(58) Field of Classification Search
None
See application file for complete search history.

(56) References Cited

U.S. PATENT DOCUMENTS 10,289,207 B1 *  5/2019  Sainty ................... G06F 3/0346
10,901,505 B1 *  1/2021  Haine ................. G06F 3/04815
(Continued)

OTHER PUBLICATIONS

Final Office Action received for U.S. Appl. No. 18/527,007, mailed on May 23, 2025, 21 pages.

(Continued)

*Primary Examiner* — Patrick N Edouard
*Assistant Examiner* — Peijie Shen
(74) *Attorney, Agent, or Firm* — Kubota & Basol LLP

(57) ABSTRACT

Some examples of the disclosure are directed to systems and methods for transitioning an object between orientations in a three-dimensional environment. In some examples, an electronic device presents a three-dimensional environment including a virtual object that is displayed in a first orientation in the three-dimensional environment. While displaying the three-dimensional environment, the electronic device detects movement of a viewpoint of a user of the electronic device. In response to detecting the movement of the viewpoint, the electronic device moves the virtual object based on the movement of the viewpoint. In accordance with a determination that the movement of the viewpoint exceeds a threshold movement, the electronic device displays the virtual object in a second orientation in the three-dimensional environment. In accordance with a determination that the movement of the viewpoint does not exceed the threshold movement, the electronic device maintains display of the virtual object in the first orientation.

24 Claims, 20 Drawing Sheets

(51) Int. Cl.
  *G06F 3/0487* (2013.01)
  *G06T 15/06* (2011.01)
(52) U.S. Cl.
  CPC .......... *G06T 15/06* (2013.01); *G06T 2200/24*
    (2013.01); *G06T 2210/21* (2013.01)

(56) References Cited

U.S. PATENT DOCUMENTS

| | | | | |
|---|---|---|---|---|
| 10,993,612 B1* | 5/2021 | Abou Shousha | ...... | A61B 3/113 |
| 11,094,106 B2* | 8/2021 | Tamaoki | ............... | A63F 13/525 |
| 11,651,563 B1* | 5/2023 | Arsan | ................... | G06T 19/006 |
| | | | | 345/419 |
| 2013/0241925 A1* | 9/2013 | Konami | ................... | G06T 15/08 |
| | | | | 345/419 |
| 2013/0336629 A1 | 12/2013 | Mulholland et al. | | |
| 2014/0267419 A1 | 9/2014 | Ballard et al. | | |
| 2014/0347390 A1* | 11/2014 | Poulos | ................... | G06F 3/011 |
| | | | | 345/633 |
| 2016/0026242 A1 | 1/2016 | Burns et al. | | |
| 2017/0046881 A1* | 2/2017 | Kuribara | ............. | G02B 27/017 |
| 2017/0052595 A1 | 2/2017 | Poulos et al. | | |
| 2017/0329480 A1* | 11/2017 | Ishikawa | ............... | G06F 3/0482 |
| 2018/0143693 A1 | 5/2018 | Calabrese et al. | | |
| 2019/0088020 A1* | 3/2019 | Fukazawa | ............. | G06T 19/006 |
| 2019/0158818 A1* | 5/2019 | Ho | ........................... | G06F 1/163 |
| 2019/0244416 A1* | 8/2019 | Tamaoki | ................ | G09G 5/377 |
| 2020/0051304 A1* | 2/2020 | Choi | ................... | G06F 3/04815 |
| 2020/0218072 A1* | 7/2020 | Inatani | ................... | H04N 7/183 |
| 2020/0233487 A1* | 7/2020 | Grzesiak | ................ | G06F 3/011 |
| 2020/0286299 A1 | 9/2020 | Wang et al. | | |
| 2020/0365117 A1* | 11/2020 | Dumas | ................... | G06F 3/012 |
| 2021/0239988 A1* | 8/2021 | Kobayashi | ......... | G02B 27/0172 |
| 2022/0139041 A1* | 5/2022 | Li | ....................... | G06F 16/9558 |
| | | | | 345/419 |
| 2022/0291744 A1* | 9/2022 | Sugihara | ................. | G06F 3/013 |
| 2023/0005098 A1* | 1/2023 | Aoki | ........................ | G09G 5/38 |
| 2023/0236674 A1* | 7/2023 | Morikawa | ............... | G06F 3/038 |
| | | | | 345/157 |
| 2023/0343028 A1* | 10/2023 | Nair | ........................ | G06F 3/012 |
| 2024/0192773 A1 | 6/2024 | Lutter et al. | | |
| 2024/0193892 A1 | 6/2024 | Lutter et al. | | |
| 2024/0212268 A1* | 6/2024 | Meno | ..................... | G06T 17/00 |

OTHER PUBLICATIONS

Non-Final Office Action received for U.S. Appl. No. 18/523,024, mailed on Jul. 2, 2025, 14 pages.

Non-Final Office Action received for U.S. Appl. No. 18/527,007, mailed on Sep. 8, 2025, 21 pages.

Non-Final Office Action received for U.S. Appl. No. 18/527,007, mailed on Feb. 18, 2025, 13 pages.

"How can I get a 3d object to always face player/camera?", Unreal Engine Forums, Epic Games, Inc., May 2014 [online]. Retrieved from <https://forums.unrealengine.com/t/how-can-i-get-a-3d-object-to-always-face-player-camera/282682>, [retrieved on Mar. 31, 2025], 6 pages.

"Rotate object to look at camera using Realitykit Look(at) is broken", Apple Developer Forums, Apple Inc., Aug. 2020 [online]. Retrieved from <https://developer.apple.com/forums/thread/656611>, [retrieved on Mar. 10, 2025], 3 pages.

Final Office Action received for U.S. Appl. No. 18/523,024, mailed on Dec. 4, 2025, 14 pages.

Mchugh, "Head-Tracked Transformations", Medium.com, Aug. 18, 2016, retrieved from the internet: <https://medium.com/humane-virtuality/head-tracked-transformations-e7102d3c9789>, 30 pages.

\* cited by examiner

Device
201

500

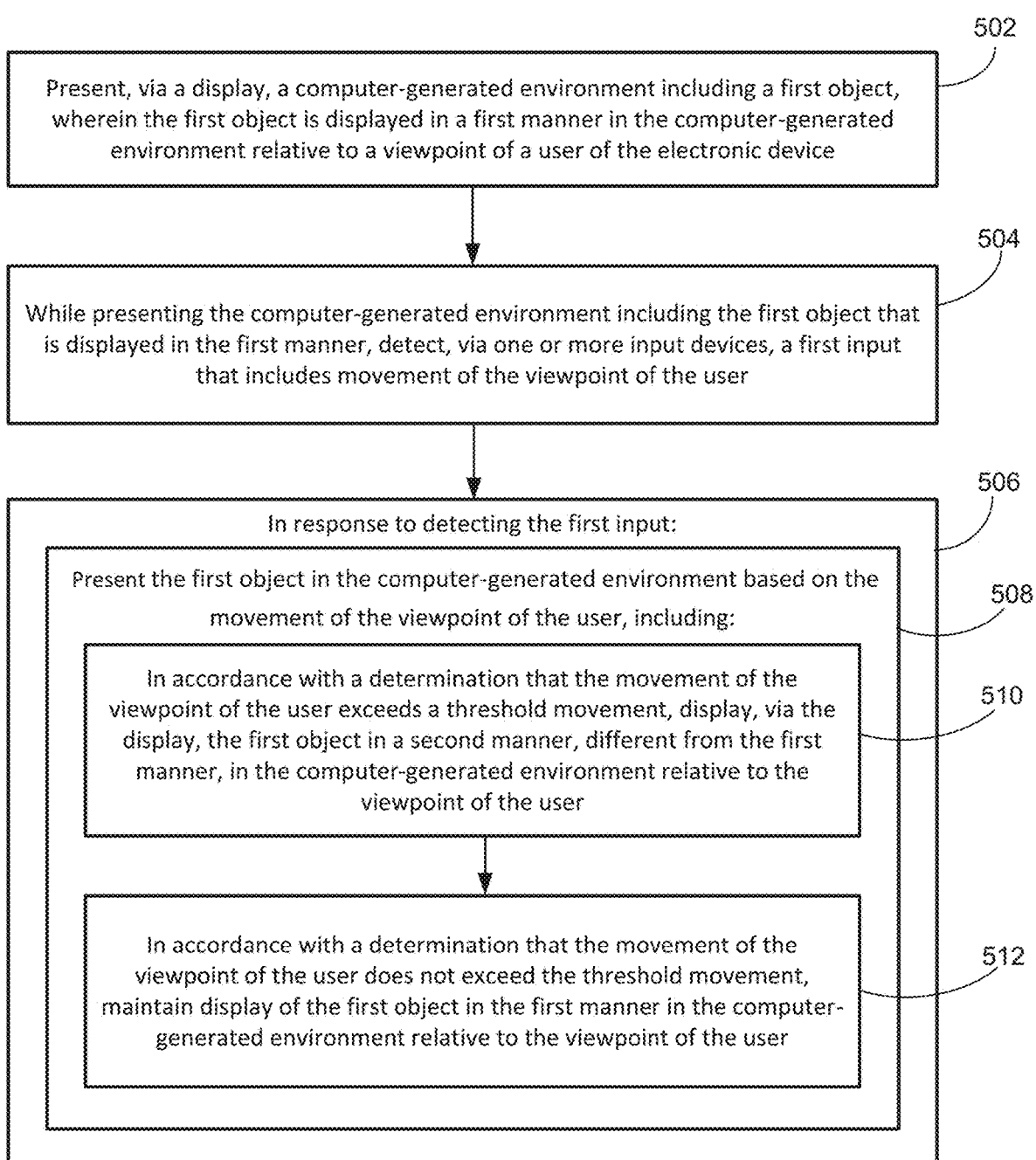

Present, via a display, a computer-generated environment including a first object, wherein the first object is displayed in a first manner in the computer-generated environment relative to a viewpoint of a user of the electronic device

502

While presenting the computer-generated environment including the first object that is displayed in the first manner, detect, via one or more input devices, a first input that includes movement of the viewpoint of the user

504

In response to detecting the first input:

506

Present the first object in the computer-generated environment based on the movement of the viewpoint of the user, including:

508

In accordance with a determination that the movement of the viewpoint of the user exceeds a threshold movement, display, via the display, the first object in a second manner, different from the first manner, in the computer-generated environment relative to the viewpoint of the user

510

In accordance with a determination that the movement of the viewpoint of the user does not exceed the threshold movement, maintain display of the first object in the first manner in the computer-generated environment relative to the viewpoint of the user

SYSTEMS AND METHODS OF TRANSITIONING DISPLAY OF A THREE-DIMENSIONAL OBJECT BASED ON TILT

CROSS-REFERENCE TO RELATED APPLICATIONS

This application claims benefit of U.S. Provisional Application No. 63/386,870, filed Dec. 9, 2022, the entire disclosure of which is herein incorporated by reference for all purposes.

FIELD OF THE DISCLOSURE

This relates generally to systems and methods of transitioning display of three-dimensional objects based on a tilt of an electronic device.

BACKGROUND OF THE DISCLOSURE

Some computer graphical environments provide two-dimensional and/or three-dimensional environments where at least some objects displayed for a user's viewing are virtual and generated by a computer. In some examples, the objects are displayed in the three-dimensional environments with particular orientations (e.g., relative to a viewpoint of a user of the computer). In some examples, an object moves in the three-dimensional environment based on a movement of the viewpoint of the user (e.g., movement of the user's head and/or torso). In some examples, an undesired or unintended view of the object is presented to the user in the three-dimensional environment after the movement of the viewpoint of the user based on the particular orientation in which the object is displayed in the three-dimensional environment.

SUMMARY OF THE DISCLOSURE

Some examples of the disclosure are directed to systems and methods for transitioning an object between tilt locked and head locked orientations in a three-dimensional environment. In some examples, an electronic device presents a computer-generated three-dimensional environment including a virtual object. In some examples, the virtual object is displayed in a tilt locked orientation in the three-dimensional environment. In some examples, while displaying the virtual object in the tilt locked orientation in the three-dimensional environment, the electronic device detects movement of a viewpoint of a user of the electronic device relative to the virtual object. In some examples, in response to detecting the movement of the viewpoint of the user, the electronic device updates presentation of the three-dimensional environment, including moving the virtual object, based on the movement of the viewpoint of the user. In some examples, in accordance with a determination that the movement of the viewpoint of the user exceeds a threshold movement, the electronic device displays the virtual object in a head locked orientation (e.g., different from the tilt locked orientation) in the three-dimensional environment. In some examples, in accordance with a determination that the movement of the viewpoint of the user does not exceed the threshold movement, the electronic device maintains display of the virtual object in the tilt locked orientation in the three-dimensional environment.

In some examples, the movement of the viewpoint of the user exceeds the threshold movement if an angular amount of the movement of the viewpoint of the user exceeds an angular threshold. In some examples, the angular threshold is measured relative to a reference ray intersecting the horizon of a field of view of the electronic device. For example, the reference ray is normal to a force of gravity. In some examples, the electronic device gradually transitions from displaying the virtual object in the tilt locked orientation to displaying the virtual object in the head locked orientation (and vice versa). For example, the electronic device displays the virtual object in a visual state that is neither head locked nor tilt locked for a predetermined amount of time or over a predetermined range of angular movement of the viewpoint of the user. In some examples, gradually transitioning from displaying the virtual object in the tilt locked orientation to displaying the virtual object in the head locked orientation (and vice versa) included tilting and/or angling the virtual object relative to the viewpoint of the user in the three-dimensional environment.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

FIG. 5 illustrates a flow diagram illustrating an example process for transitioning an object between tilt locked and head locked orientations in a three-dimensional environment according to some examples of the disclosure.

DETAILED DESCRIPTION

Figure 1:
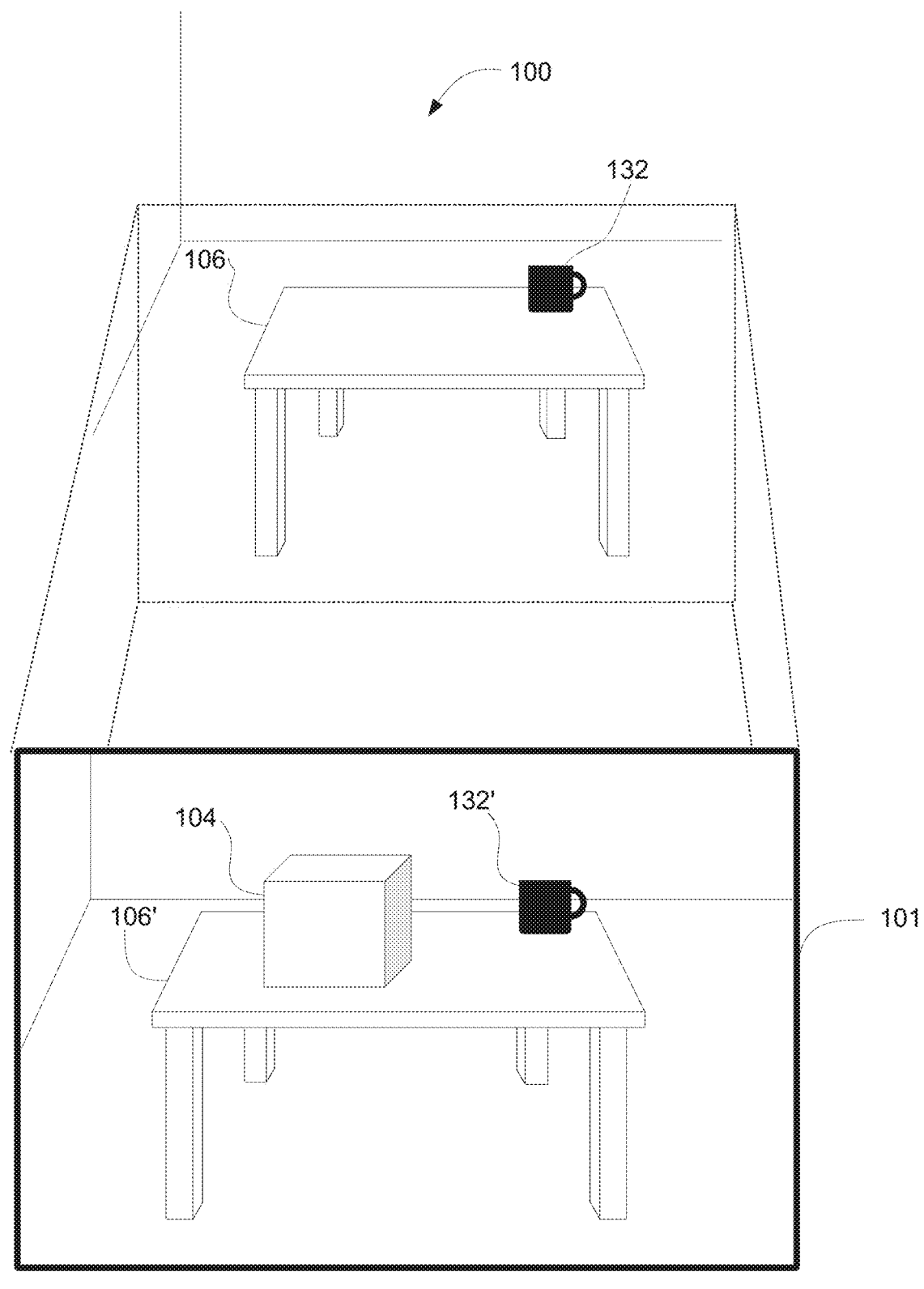
FIG. 1 illustrates an electronic device presenting an extended reality environment according to some examples of the disclosure.

Some examples of the disclosure are directed to systems and methods for transitioning an object between tilt locked and head locked orientations in a three-dimensional environment. In some examples, an electronic device presents a computer-generated three-dimensional environment including a virtual object. In some examples, the virtual object is displayed in a tilt locked orientation in the three-dimensional environment. In some examples, while displaying the virtual object in the tilt locked orientation in the three-dimensional environment, the electronic device detects movement of a viewpoint of a user of the electronic device relative to the virtual object. In some examples, in response to detecting the movement of the viewpoint of the user, the electronic device updates presentation of the three-dimensional environment, including moving the virtual object, based on the movement of the viewpoint of the user. In some examples, in accordance with a determination that the movement of the viewpoint of the user exceeds a threshold movement, the electronic device displays the virtual object in a head locked orientation (e.g., different from the tilt locked orientation) in the three-dimensional environment. In some examples, in accordance with a determination that the movement of the viewpoint of the user does not exceed the threshold movement, the electronic device maintains display of the virtual object in the tilt locked orientation in the three-dimensional environment.

In some examples, the movement of the viewpoint of the user exceeds the threshold movement if an angular amount of the movement of the viewpoint of the user exceeds an angular threshold. In some examples, the angular threshold is measured relative to a reference ray intersecting the horizon of a field of view of the electronic device. For example, the reference ray is normal to a force of gravity. In some examples, the electronic device gradually transitions from displaying the virtual object in the tilt locked orientation to displaying the virtual object in the head locked orientation (and vice versa). For example, the electronic device displays the virtual object in a visual state that is neither head locked nor tilt locked for a predetermined amount of time or over a predetermined range of angular movement of the viewpoint of the user. In some examples, gradually transitioning from displaying the virtual object in the tilt locked orientation to displaying the virtual object in the head locked orientation (and vice versa) includes tilting and/or angling the virtual object relative to the viewpoint of the user in the three-dimensional environment.

In some examples, displaying an object in a three-dimensional environment with a particular orientation may include interaction with one or more user interface objects in the three-dimensional environment. For example, initiation of display of the object in the three-dimensional environment can include interaction with one or more virtual options/affordances displayed in the three-dimensional environment. In some examples, a user's gaze may be tracked by the electronic device as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

In some examples, a three-dimensional object is displayed in a computer-generated three-dimensional environment with a particular orientation that controls one or more behaviors of the three-dimensional object (e.g., when the three-dimensional object is moved within the three-dimensional environment). In some examples, the orientation in which the three-dimensional object is displayed in the three-dimensional environment is selected by a user of the electronic device or automatically selected by the electronic device. For example, when initiating presentation of the three-dimensional object in the three-dimensional environment, the user may select a particular orientation for the three-dimensional object or the electronic device may automatically select the orientation for the three-dimensional object (e.g., based on a type of the three-dimensional object). In some examples, a three-dimensional object can be displayed in the three-dimensional environment in a world locked orientation, a body locked orientation, a tilt locked orientation, or a head locked orientation, as described below.

As used herein, an object that is displayed in a body locked orientation in a three-dimensional environment has a distance and orientation offset relative to a portion of the user's body (e.g., the user's torso). For example, if the user rotates their torso (irrespective of any head rotation) in the yaw direction, the body locked object would follow the torso rotation and be repositioned within the three-dimensional environment such that it is the same distance and orientation offset relative to the user's torso as before the torso rotation. Alternatively, in some examples, a body locked object has a fixed distance from the user without the orientation of the content being referenced to any portion of the user's body (e.g., may be displayed in the same cardinal direction relative to the user, regardless of head and/or body movement). For example, the body locked object would not reposition itself in accordance with the torso rotation in the yaw direction (e.g., the body locked object would remain the same distance offset relative to the user's torso but would not be repositioned to have the same orientation offset relative to the user's torso). Additionally or alternatively, in some examples, the body locked object may be configured to always remain gravity or horizon (e.g., normal to gravity) aligned, such that head and/or body changes in the roll direction would not cause the body locked object to move within the three-dimensional environment. Rather, translational movement in either configuration would cause the body locked object to be repositioned within the three-dimensional environment to maintain the distance offset.

As used herein, an object that is displayed in a head locked orientation in a three-dimensional environment has a distance and orientation offset relative to the user's head. In some examples, a head locked object moves within the three-dimensional environment as the user's head moves (as the viewpoint of the user changes). For example, if the user rotates their head (e.g., clockwise or counterclockwise) in the yaw direction, the head locked object would follow the head rotation and be repositioned within the three-dimensional environment such that it is the same distance and orientation offset relative to the user's head as before the head rotation.

As used herein, an object that is displayed in a world locked orientation in a three-dimensional environment does not have a distance or orientation offset relative to the user. For example, a world locked object remains displayed at the same location in the three-dimensional environment and with the same orientation irrespective of any movement of the user's head and/or torso (e.g., in the yaw, roll, and/or pitch directions).

As used herein, an object that is displayed in a tilt locked orientation in a three-dimensional environment (referred to herein as a tilt locked object) has a distance offset relative to the user, such as a portion of the user's body (e.g., the user's torso) or the user's head. In some examples, a tilt locked object is displayed at a fixed orientation relative to the three-dimensional environment. In some examples, a tilt locked object moves according to a polar (e.g., spherical) coordinate system centered at a pole through the user (e.g., the user's head). For example, the tilt locked object is moved in the three-dimensional environment based on movement of the user's head within a spherical space surrounding (e.g., centered at) the user's head. Accordingly, if the user tilts their head (e.g., upward or downward in the pitch direction) relative to gravity, the tilt locked object would follow the head tilt and move radially along a sphere, such that the tilt locked object is repositioned within the three-dimensional environment to be the same distance offset relative to the user as before the head tilt while optionally maintaining the same orientation relative to the three-dimensional environment. In some examples, if the user moves their head in the roll direction (e.g., clockwise or counterclockwise) relative to gravity, the tilt locked object is not repositioned within the three-dimensional environment.

FIG. 1 illustrates an electronic device 101 presenting an extended reality (XR) environment (e.g., a computer-generated environment) according to some examples of the disclosure. In some examples, electronic device 101 is a hand-held or mobile device, such as a tablet computer, laptop computer, smartphone, or head-mounted display. Examples of device 101 are described below with reference to the architecture block diagram of FIG. 2. As shown in FIG. 1, electronic device 101, table 106, and coffee mug 132 are located in the physical environment 100. The physical environment may include physical features such as a physical surface (e.g., floor, walls) or a physical object (e.g., table, lamp, etc.). In some examples, electronic device 101 may be configured to capture images of physical environment 100 including table 106 and coffee mug 132 (illustrated in the field of view of electronic device 101). In some examples, in response to a trigger, the electronic device 101 may be configured to display a virtual object 104 (e.g., two-dimensional virtual content) in the computer-generated environment (e.g., represented by a cube illustrated in FIG. 1) that is not present in the physical environment 100, but is displayed in the computer-generated environment positioned on (e.g., anchored to) the top of a computer-generated representation 106' of real-world table 106. For example, virtual object 104 can be displayed on the surface of the computer-generated representation 106' of the table in the computer-generated environment next to the computer-generated representation 132' of real-world coffee mug 132 displayed via electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional computer-generated environment. For example, the virtual object can represent an application or a user interface displayed in the computer-generated environment. In some examples, the virtual object can represent content corresponding to the application and/or displayed via the user interface in the computer-generated environment. In some examples, the virtual object 104 is optionally configured to be interactive and responsive to user input, such that a user may virtually touch, tap, move, rotate, or otherwise interact with, the virtual object 104. In some examples, the virtual object 104 may be displayed in a three-dimensional computer-generated environment with a particular orientation. For example, the virtual object 104 may be displayed in a tilt locked orientation, a head locked orientation, a body locked orientation, or a world locked orientation in the three-dimensional environment. In some such examples, as described in more detail below, while the virtual object 104 is displayed in the three-dimensional environment, the electronic device selectively moves the virtual object 104 in response to user input (e.g., direct input or indirect input) according to the particular orientation in which the virtual object is displayed. For example, the electronic device selectively moves the virtual object 104 in response to movement of a viewpoint of the user depending on whether the virtual object 104 is body locked, head locked, tilt locked, or world locked. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
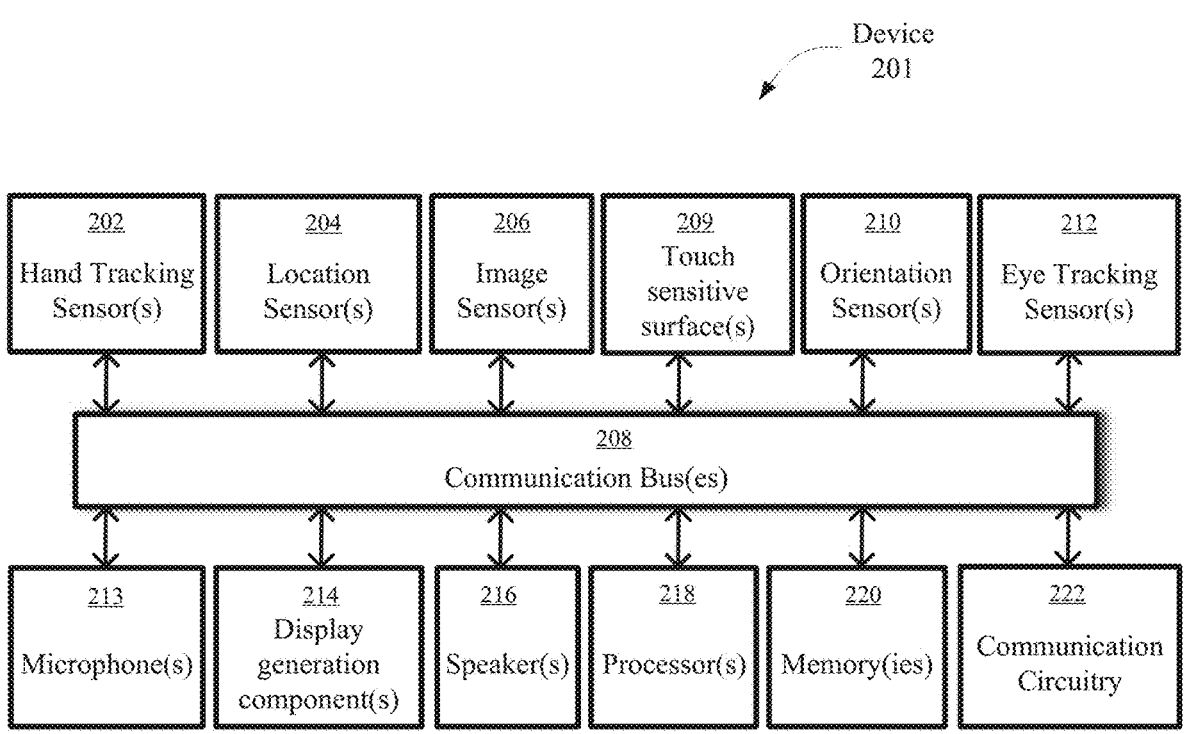
FIG. 2 illustrates a block diagram of an exemplary architecture for a device according to some examples of the disclosure.

FIG. 2 illustrates a block diagram of an exemplary architecture for a device 201 according to some examples of the disclosure. In some examples, device 201 includes one or more electronic devices. For example, the electronic device 201 may be a portable device, such as a mobile phone, smart phone, a tablet computer, a laptop computer, an auxiliary device in communication with another device, a head-mounted display, etc., respectively.

As illustrated in FIG. 2, the electronic device 201 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218, one or more memories 220, and/or communication circuitry 222. One or more communication buses 208 are optionally used for communication between the above-mentioned components of electronic devices 201.

Communication circuitry 222 optionally includes circuitry for communicating with electronic devices, networks, such as the Internet, intranets, a wired network and/or a wireless network, cellular networks, and wireless local area networks (LANs). Communication circuitry 222 optionally includes circuitry for communicating using near-field communication (NFC) and/or short-range communication, such as Bluetooth®.

Processor(s) 218 include one or more general processors, one or more graphics processors, and/or one or more digital signal processors. In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memory 220 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some examples, display generation component(s) 214 include a single display (e.g., a liquid-crystal display (LCD), organic light-emitting diode (OLED), or other types of display). In some examples, display generation component(s) 214 includes multiple displays. In some examples, display generation component(s) 214 can include a display with touch capability (e.g., a touch screen), a projector, a holographic projector, a retinal projector, etc. In some examples, electronic device 201 includes touch-sensitive surface(s) 209, respectively, for receiving user inputs, such as tap inputs and swipe inputs or other gestures. In some examples, display generation component(s) 214 and touch-sensitive surface(s) 209 form touch-sensitive display(s) (e.g., a touch screen integrated with electronic device 201 or external to electronic device 201 that is in communication with electronic device 201).

Electronic device 201 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from electronic device 201. In some examples, information from one or more depth sensors can allow the device to identify and differentiate objects in the real-world environment from other objects in the real-world environment. In some examples, one or more depth sensors can allow the device to determine the texture and/or topography of objects in the real-world environment. In some examples, electronic device 201 uses CCD sensors, event cameras, and depth sensors in combination to detect the physical environment around electronic device 201. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic device 201 uses image sensor(s) 206 to detect the position and orientation of electronic device 201 and/or display generation component(s) 214 in the real-world environment. For example, electronic device 201 uses image sensor(s) 206 to track the position and orientation of display generation component(s) 214 relative to one or more fixed objects in the real-world environment.

In some examples, electronic device 201 includes microphone(s) 213 or other audio sensors. Electronic device 201 optionally uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Electronic device 201 includes location sensor(s) 204 for detecting a location of electronic device 201 and/or display generation component(s) 214. For example, location sensor(s) 204 can include a GPS receiver that receives data from one or more satellites and allows electronic device 201 to determine the device's absolute position in the physical world.

Electronic device 201 includes orientation sensor(s) 210 for detecting orientation and/or movement of electronic device 201 and/or display generation component(s) 214. For example, electronic device 201 uses orientation sensor(s) 210 to track changes in the position and/or orientation of electronic device 201 and/or display generation component(s) 214, such as with respect to physical objects in the real-world environment. Orientation sensor(s) 210 optionally include one or more gyroscopes and/or one or more accelerometers.

Electronic device 201 includes hand tracking sensor(s) 202 and/or eye tracking sensor(s) 212, in some examples. Hand tracking sensor(s) 202 are configured to track the position/location of one or more portions of the user's hands, and/or motions of one or more portions of the user's hands with respect to the extended reality environment, relative to the display generation component(s) 214, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214. In some examples, hand tracking sensor(s) 202 and/or eye tracking sensor(s) 212 are implemented together with the display generation component(s) 214. In some examples, the hand tracking sensor(s) 202 and/or eye tracking sensor(s) 212 are implemented separate from the display generation component(s) 214.

In some examples, the hand tracking sensor(s) 202 can use image sensor(s) 206 (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some examples, one or more image sensor(s) 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by a respective eye tracking camera/illumination source(s).

Electronic device 201 is not limited to the components and configuration of FIG. 2, but can include fewer, other, or additional components in multiple configurations. In some examples, device 201 can be implemented between two electronic devices (e.g., as a system). A person or persons using electronic device 201, is optionally referred to herein as a user or users of the device.

Attention is now directed towards interactions with one or more virtual objects that are displayed in a three-dimensional environment presented at an electronic device (e.g., corresponding to electronic device 201) in one or more orientations. As discussed below, the one or more virtual objects may be displayed in the three-dimensional environment in a body locked orientation, a head locked orientation, tilt locked, and/or a world locked orientation. In some examples, the electronic device selectively moves the one or more virtual objects in the three-dimensional environment in response to detecting movement of a viewpoint of a user of the electronic device depending on the orientation in which the one or more virtual objects are displayed in the three-dimensional environment. As described below, movement of the viewpoint of the user optionally causes the display generation component (e.g., display generation component(s) 214) to move within the physical environment surrounding the electronic device, which causes the portion of the physical environment and/or the three-dimensional environment displayed via the display generation component to be updated in accordance with the movement of the viewpoint.

FIGS. 3A-3F illustrate example interactions involving tilt locked and head locked objects in a three-dimensional environment according to some examples of the disclosure. In some examples, electronic device 301 may present a three-dimensional environment 350. The electronic device 301 may be similar to device 101 or 201 discussed above, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, or displays formed as lenses designed to be placed on a person's eyes (e.g., similar to contact lenses). In the example of FIGS. 3A-3F, a user is optionally wearing the electronic device 301, such that the three-dimensional environment 350 can be defined by X, Y and Z axes as viewed from a perspective of the electronic device (e.g., a viewpoint associated with the user of the electronic device 301). Accordingly, as used herein, the electronic device 301 is configured to be movable with six degrees of freedom based on the movement of the user (e.g., the head of the user), such that the electronic device 301 may be moved in the roll direction, the pitch direction, and/or the yaw direction.

Figure 3A:
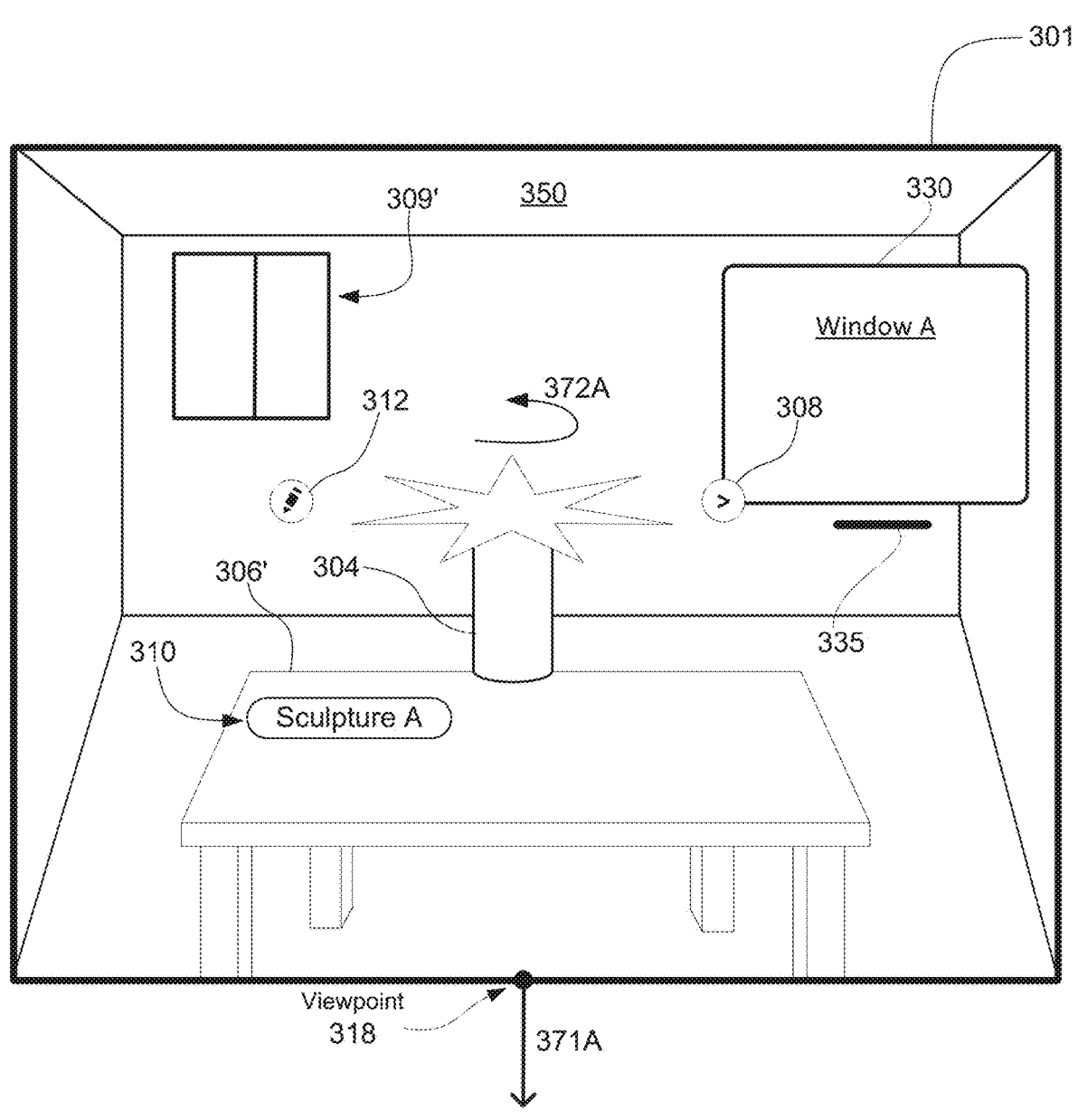
FIGS. 3A-3F illustrate example interactions involving tilt locked and head locked objects in a three-dimensional environment according to some examples of the disclosure.

As shown in FIG. 3A, the electronic device 301 may be positioned in a physical environment that includes a table 306 (e.g., corresponding to real-world table 106 in FIG. 1) and a window 309. Thus, the three-dimensional environment 350 presented using the electronic device 301 optionally includes captured portions of the physical environment surrounding the electronic device 301, such as a representation of the table 306' and a representation of the window 309'. Additionally, as shown in FIG. 3A, the three-dimensional environment 350 may include representations of the floor, ceiling, and walls of the room in which the electronic device 301 is located. In some examples, the representations can include portions of the physical environment viewed through a transparent or translucent display of electronic device 301.

In some examples, the three-dimensional environment 350 may include one or more virtual objects. For example, as shown in FIG. 3A, the electronic device 301 is displaying a virtual object 304 (e.g., a virtual sculpture) and a virtual application window 330 ("Window A"). In some examples, the virtual object 304 and the application window 330 may be associated with applications running on the electronic device 301. As shown in FIG. 3A, the application window 330 may be displayed with a grabber bar 335 (also referred to as a handlebar affordance) which is optionally selectable to initiate movement (e.g., translation) of the application window 330 within the three-dimensional environment 350. Although not explicitly illustrated in FIG. 3A, the virtual object 304 may also be displayed with a grabber bar (e.g., similar to grabber bar 335) that is selectable to initiate movement (e.g., translation) of the virtual object 304 within the three-dimensional environment 350.

In some examples, as mentioned above, the one or more virtual objects may be displayed in the three-dimensional environment 350 with respective orientations that (e.g., initially) are automatically selected by the electronic device 301. For example, in FIG. 3A, the orientation of the virtual object 304 and the orientation of the application window 330 are selected by the electronic device 301 based on object type (e.g., a three-dimensional object vs. a two-dimensional object) and/or based on object data (e.g., commands) received by their respective applications when the objects are first displayed in the three-dimensional environment 350. In the example of FIG. 3A, the virtual object 304 may be displayed in a tilt locked orientation in the three-dimensional environment 350 and the application window 330 may be displayed in a world locked orientation in the three-dimensional environment 350. In some examples, because the virtual object 304 is tilt locked in the three-dimensional environment 350, the electronic device 301 displays the virtual object 304 at a center of the field of view of the display generation component of the electronic device 301 relative to the viewpoint of the user of the electronic device 301, as shown in FIG. 3A.

In some examples, as shown in FIG. 3A, the virtual object 304 is displayed with one or more user interface elements in the three-dimensional environment 350. For example, as shown in FIG. 3A, the virtual object 304 is displayed with a first user interface object 312 and a second user interface object 308 for interacting with the virtual object 304. As an example, the first user interface object 312 may be selectable to initiate a process for editing/modifying a visual appearance of the virtual object 304 (e.g., displaying one or more editing controls in the three-dimensional environment 350). The second user interface object 308 is optionally selectable to display a user interface of the application with which the virtual object 304 is associated. For example, the user may select a different virtual object for display in the three-dimensional environment 350 via the user interface. Additionally, as shown in FIG. 3A, the electronic device 301 optionally displays a virtual text label 310 with the virtual object 304 in the three-dimensional environment 350. In some examples, the virtual text label 310 indicates a name or title of the virtual object 304 (e.g., a title of the virtual sculpture, "Sculpture A").

In some examples, the one or more user interface elements are displayed relative to the virtual object 304 in the three-dimensional environment 350. For example, as described below, movement of the virtual object 304 in the three-dimensional environment 350 causes the first user interface object 312, the second user interface object 308, and the virtual text label 310 to move with the virtual object 304 (e.g., in a direction of the movement of the virtual object 304). As mentioned previously above, in FIG. 3A, the virtual object 304 is optionally displayed in tilt locked orientation in the three-dimensional environment 350. In some examples, while the virtual object 304 is displayed in the tilt locked orientation, the one or more user interface elements (e.g., 308, 310, and 312) are displayed according to a polar coordinate system with the virtual object 304. For example, the virtual object 304, the first user interface object 312, the second user interface object 308, and the virtual text label 310 are displayed at unique locations relative to a pole (e.g., a vertical pole) at a predefined portion of the user (e.g., the user's torso). Accordingly, when the virtual object 304 is moved in the three-dimensional environment 350, the one or more user interface elements in FIG. 3A are moved in a polar coordinate space with the virtual object 304 relative to the pole at the predefined portion of the user.

In some examples, as shown in FIG. 3A, the electronic device 301 rotates the virtual object 304 while the virtual object 304 is displayed in the three-dimensional environment 350. For example, as shown in FIG. 3A, the electronic device 301 rotates the virtual object 304, as represented by arrow 372A, about a vertical axis through the virtual object 304 while the virtual object 304 is displayed in the three-dimensional environment 350. In some examples, the electronic device 301 is rotating the virtual object 304 in the three-dimensional environment 350 in accordance with object data received from the application associated with the virtual object 304, and not because the virtual object 304 is displayed tilt locked in the three-dimensional environment 350. In other examples, the electronic device 301 does not move the virtual object 304 absent user input.

In some examples, while the three-dimensional environment 350 is presented at the electronic device 301, a viewpoint 318 of the three-dimensional environment 350 and/or a location of the viewpoint of the user optionally changes in accordance with movement/rotation of the electronic device 301 (e.g., by the user of the electronic device 301). For example, while the three-dimensional environment 350 is displayed, if the electronic device 301 is moved closer toward the representation of the table 306' and/or the representation of the window 309' (e.g., because the user of the electronic device 301 moved forward in the physical environment surrounding the electronic device 301), the viewpoint 318 of the user of the electronic device 301 would change accordingly, such that the representation of the table 306' and the representation of the window 309' appear larger in the field of view of three-dimensional environment 350. Similarly, if the electronic device 301 moves rightward in the physical environment (e.g., because the user of the electronic device 301 moved rightward in the physical environment surrounding the electronic device 301), the viewpoint 318 of the user of the electronic device 301 would change accordingly, such that the representation of the table 306' and the representation of the window 309' appear farther to the left in the field of view of the three-dimensional environment 350 relative to the viewpoint 318 of the user.

In some examples, when the viewpoint 318 of the user moves in the pitch direction relative to the three-dimensional environment 350, tilt locked objects move in the three-dimensional environment 350 in accordance with the movement of the viewpoint 318. For example, because an object that is tilt locked is displayed with a fixed distance and/or orientation offset relative to a portion of the user's body (e.g., the user's torso or the user's head), the tilt locked object is moved in the three-dimensional environment 350 to remain at the fixed distance and/or orientation offset relative to the portion of the user's body at the new viewpoint of the user. In FIG. 3A, the electronic device 301 optionally detects radial movement of the viewpoint 318 of the user. For example, as shown in FIG. 3A, the electronic device 301 is moved radially downward in the pitch direction, as represented by arrow 371A, in the physical environment surrounding the electronic device 301 (e.g., because the head of the user wearing the electronic device 301 moves downward in the pitch direction), which causes the display generation component of the electronic device 301 to also move downward in the physical environment. In some examples, the movement of the viewpoint 318 of the user corresponds to tilting of the head of the user toward the floor of the physical environment in which the electronic device 301 is located.

Figure 3B:
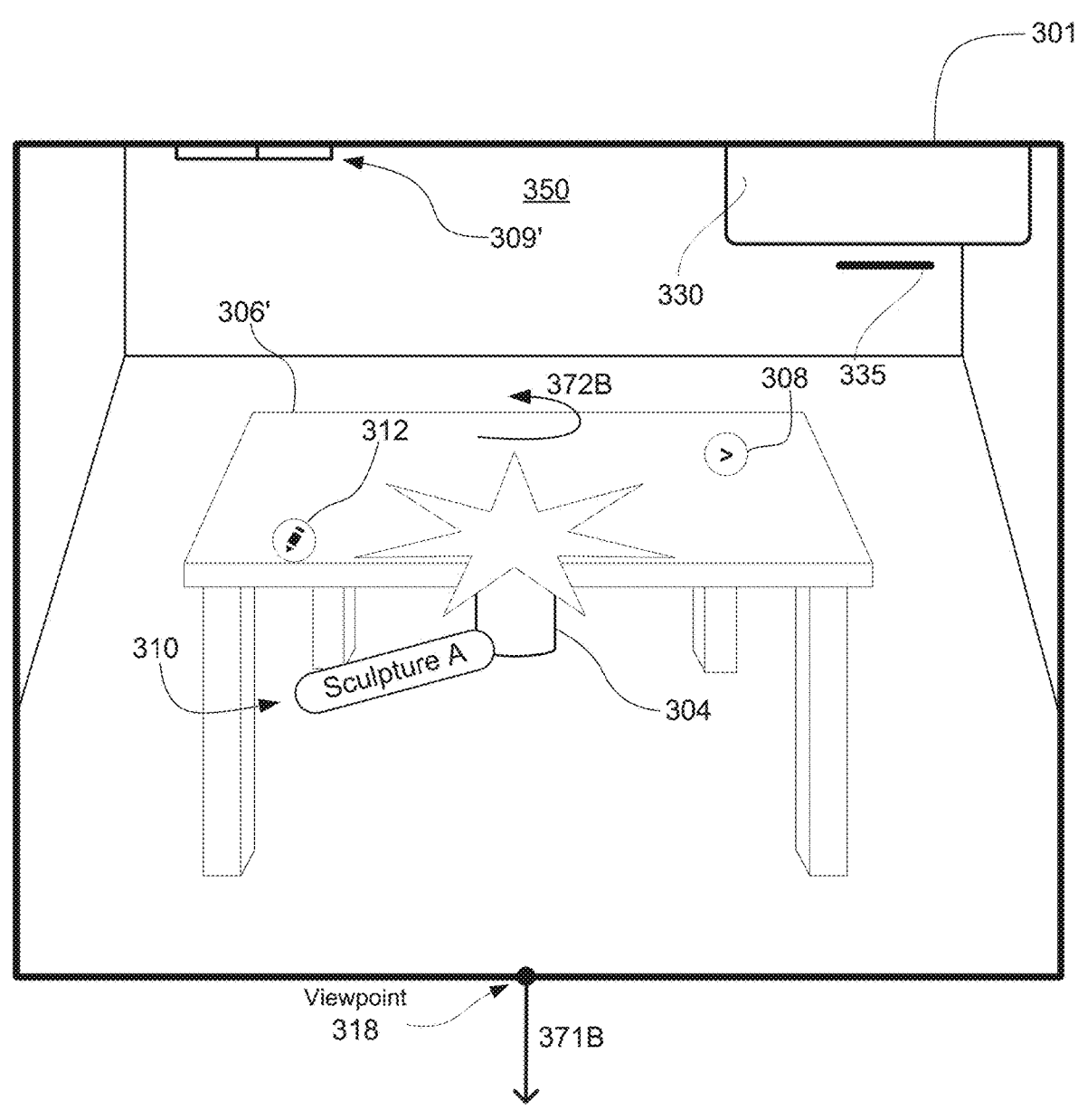

In some examples, as shown in FIG. 3B, in response to detecting the movement of the viewpoint 318 of the user of the electronic device 301, the electronic device 301 updates presentation of the three-dimensional environment 350. For example, as shown in FIG. 3B, the downward movement of the viewpoint 318 of the user causes the representation of the table 306' and the representation of the window 309' to be shifted upward in the view of the three-dimensional environment 350 relative to the new viewpoint of the user. Additionally, because the viewpoint 318 has moved downward in the pitch direction, a greater portion of the floor of the physical environment is visible in the view of the three-dimensional environment 350, as shown in FIG. 3B.

In some examples, as previously mentioned above, in response to detecting the downward movement of the viewpoint 318 of the user, the electronic device 301 moves the virtual object 304 in the three-dimensional environment 350 based on the movement of the viewpoint 318. For example, as shown in FIG. 3B, because the virtual object 304 is tilt locked, the electronic device 301 moves the virtual object 304 to maintain the same distance and/or orientation offset relative to the predefined portion of the user (e.g., the user's torso) in the three-dimensional environment 350. As shown in FIG. 3B, the virtual object 304 is optionally still displayed centrally in the user's field of view in the three-dimensional environment 350. On the other hand, in response to detecting the downward movement of the viewpoint 318 of the user, the electronic device 301 forgoes moving the application window 330 in the three-dimensional environment 350 based on the movement of the viewpoint 318. For example, as shown in FIG. 3B, the application window 330 is not displayed in the view of the three-dimensional environment 350 at the same distance and/or orientation offset relative to the user's head as shown previously in FIG. 3A. In some examples, because the application window 330 is world locked in the three-dimensional environment 350, the application window 330 remains displayed at the same location in the three-dimensional environment 350 irrespective of the movement of the viewpoint 318. Accordingly, as shown in FIG. 3B, the application window 330 is shifted upward in the view of the three-dimensional environment 350.

As shown in FIG. 3B, when the viewpoint 318 of the user is moved downward in the pitch direction relative to the three-dimensional environment 350, the virtual object 304 rotates in the pitch direction in the three-dimensional environment 350 relative to the viewpoint 318 of the user. For example, as shown in FIG. 3B, a top end of the virtual object 304 is rotated in the pitch direction such that a greater portion of the top end is facing toward the viewpoint 318 of the user than before the movement of the viewpoint 318 was detected (e.g., in FIG. 3A). Accordingly, as shown in FIG. 3B, a smaller portion of the bottom portion of the virtual object 304 (e.g., the cylindrical portion) is visible from the viewpoint 318 of the user in the three-dimensional environment 350. In some examples, an amount of the rotation of the virtual object 304 in the pitch direction in the three-dimensional environment 350 is based on (e.g., equal or proportional to) an amount of movement of the viewpoint 318 of the user in the pitch direction. In other examples, the virtual object 304 does not rotate in the pitch direction relative to the three-dimensional environment 350. In some examples, as shown in FIG. 3B, the electronic device 301 continues to rotate the virtual object 304 about a vertical axis through the virtual object 304, as represented by arrow 372B, in the three-dimensional environment 350.

Additionally, as shown in FIG. 3B, when the electronic device 301 moves the virtual object 304 in the three-dimensional environment 350, the one or more user interface elements are also moved with the virtual object 304. For example, as shown in FIG. 3B, the electronic device 301 moves the first user interface object 312, the second user interface object 308, and the virtual text label 310 with the virtual object 304. As shown in FIG. 3B, the one or more user interface elements continue to face toward the viewpoint 318 of the user when the one or more user interface elements are moved in the three-dimensional environment 350. For example, as shown in FIG. 3B, the graphical representation (e.g., icon) that is associated with the first user interface object 312 and the second user interface object 308, and the text ("Sculpture A") of the visual text label 310 continue to be visible and front-facing relative to the viewpoint 318. As described previously above, in some examples, the one or more user interface elements are displayed according to a polar coordinate system when the virtual object 304 is displayed in a tilt locked orientation in the three-dimensional environment 350. Accordingly, as shown in FIG. 3B, as the viewpoint 318 of the user moves farther down in the pitch direction compared to viewpoint 318 in FIG. 3A, the more the first user interface object 312, the second user interface object 308, and the virtual text label 310 begin to overlap with the virtual object 304 in the three-dimensional environment 350 relative to the viewpoint 318 of the user. For example, as similarly discussed above, the first user interface object 312, the second user interface object 308, and the virtual text label 310 are displayed at unique locations within the polar coordinate system relative to a pole through the torso of the user, and the more the viewpoint 318 of the user moves down in the pitch direction, the more the first user interface object 312, the second user interface object 308, and the virtual text label 310 appear to tilt inward relative to the viewpoint 318 of the user, as shown in FIG. 3B.

In FIG. 3B, the electronic device 301 optionally detects further radial movement of the viewpoint 318 of the user relative to the three-dimensional environment 350. For example, as shown in FIG. 3B, the electronic device 301 is moved further radially downward in the pitch direction, as represented by arrow 371B, in the physical environment (e.g., due to movement of the electronic device 301 by the user (e.g., movement of the user's head)). In some examples, the further movement of the viewpoint 318 of the user corresponds to tilting of the head of the user further toward the floor of the physical environment in which the electronic device 301 is located.

Figure 3C:
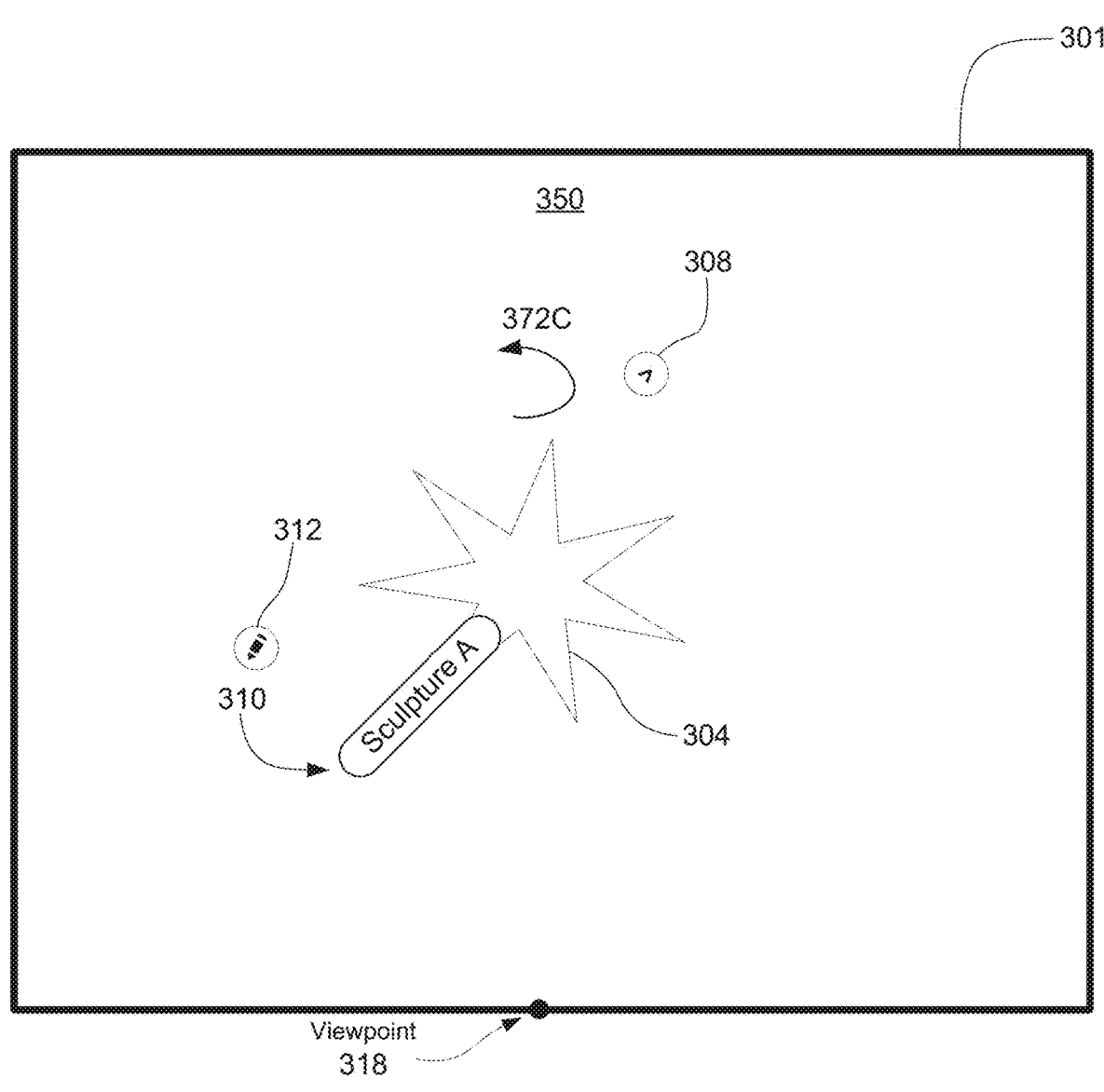

In some examples, in response to detecting the movement of the viewpoint 318 of the user, as shown in FIG. 3C, the electronic device 301 updates presentation of the three-dimensional environment 350 in accordance with the movement of the viewpoint 318. For example, as shown in FIG. 3C, the movement of the viewpoint 318 further downward in the pitch direction causes the floor of the physical environment surrounding the electronic device 301 to occupy the field of view of the user. Accordingly, as shown in FIG. 3C, the representation of the table 306' and the representation of the window 309' are no longer visible in the view of the three-dimensional environment 350 from the new viewpoint 318 of the user. Additionally, as similarly discussed above, because the application window 330 is world locked in the three-dimensional environment 350, the further movement of the viewpoint 318 downward in the pitch direction causes the application window 330 to no longer be displayed in the view of the three-dimensional environment 350, as shown in FIG. 3C.

As shown in FIG. 3C and as similarly described above, in response to detecting the further movement of the viewpoint 318, the electronic device 301 moves the virtual object 304 in the three-dimensional environment 350 based on the movement of the viewpoint. For example, as shown in FIG. 3C, the virtual object 304 continues to be displayed centrally in the field of view of the user in the three-dimensional environment 350 (e.g., at the same distance and/or orientation offset relative to the user's torso) despite the floor of the physical environment now occupying the field of view of the user from the new viewpoint 318. Additionally, as shown in FIG. 3C, the electronic device 301 rotates the virtual object 304 further in the pitch direction in response to detecting the further movement of the viewpoint 318 of the user. For example, as shown in FIG. 3C, because the virtual object 304 is tilt locked in the three-dimensional environment 350, the top end of the virtual object 304 faces toward the viewpoint 318 of the user when the viewpoint 318 of the user is angled downward toward the floor of the physical environment surrounding the electronic device 301 (e.g., the virtual object 304 maintains its orientation relative to the three-dimensional environment 350). Additionally, as shown in FIG. 3C, the electronic device 301 continues to rotate the virtual object 304, as represented by arrow 372C, such that the top end of the virtual object 304 rotates in the roll direction in the three-dimensional environment 350.

As similarly discussed above, when the electronic device 301 moves the virtual object 304 in the three-dimensional environment 350 based on the movement of the viewpoint 318 of the user, the electronic device 301 moves the one or more user interface elements with the virtual object 304, as shown in FIG. 3C. For example, as shown in FIG. 3C, the electronic device 301 moves the first user interface object

312, the second user interface object 308, and the virtual text label 310 with the virtual object 304 in the three-dimensional environment 350. In some examples, as shown in FIG. 3C and as previously described above, because the first user interface object 312, the second user interface object 308, and the virtual text label 310 are displayed according to a polar coordinate system in the three-dimensional environment, the first user interface object 312, the second user interface object 308, and the virtual text label 310 are tilted more inward relative to the viewpoint 318 of the user when the viewpoint 418 of the user is moved farther downward in the pitch direction. Accordingly, as shown in FIG. 3C, the inward tilt of the one or more user interface elements causes the virtual text label 310 to overlap with a greater portion of the virtual object 304, obscuring and/or preventing the user from viewing the whole top end of the virtual object 304 in the three-dimensional environment 350 relative to the new viewpoint 318 of the user. Further, the user may desire to continue facing a side of the virtual object 304 (e.g., as in FIG. 3A) even when the viewpoint 318 of the user is angled toward the floor of the physical environment surrounding the electronic device 301. Accordingly, though displaying the virtual object 304 in the tilt locked orientation in the three-dimensional environment 350 enables the user to view the virtual object 304 and the one or more user interface elements in an unobstructed and natural manner when the viewpoint 318 of the user is angled toward the horizon (e.g., substantially normal to gravity, such as a threshold angle (e.g., 1, 5, 10, 15, 20, 30, etc. degrees) of being normal to gravity), the one or more user interface elements may at least partially obstruct and/or prevent the user from viewing the virtual object 304 and/or a side of the virtual object 304 when the viewpoint 318 of the user is angled toward the ground (e.g., parallel to gravity, such as a threshold angle (e.g., 1, 5, 10, 15, 20, 30, etc. degrees) of being parallel to gravity).

Figure 3D:
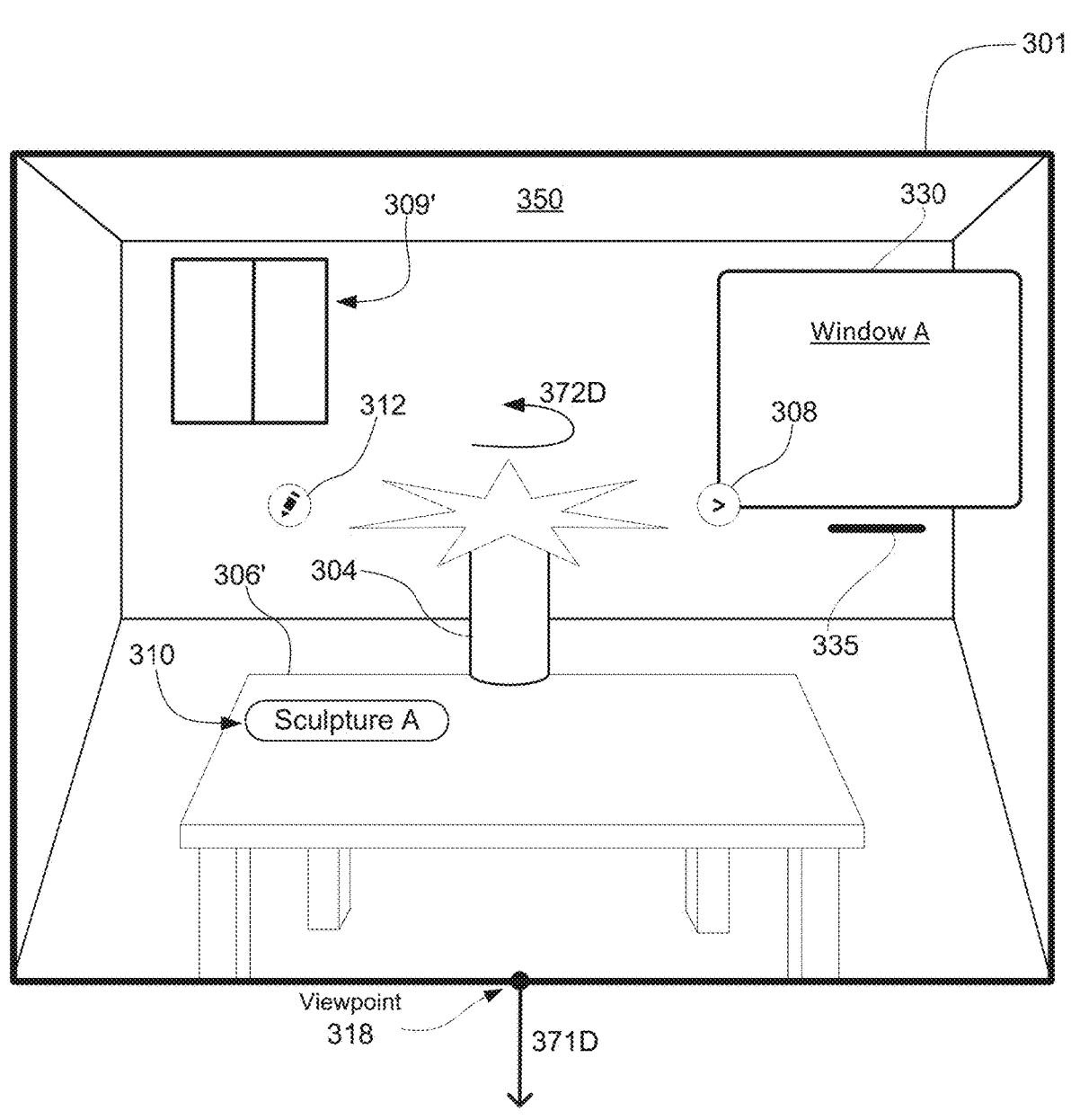

In some examples, the virtual object 304 may alternatively be displayed in a different orientation in the three-dimensional environment 350. In FIG. 3D, the electronic device 301 is displaying the virtual object 304 in the head locked orientation in the three-dimensional environment 350. In some examples, the three-dimensional environment 350 corresponds to the three-dimensional environment 350 in FIG. 3A. Additionally, as shown in FIG. 3D, the electronic device 301 is displaying the application window 330 in the three-dimensional environment 350. As previously discussed above, in FIG. 3D, the application window 330 may be world locked in the three-dimensional environment 350. Further, as shown in FIG. 3D, the virtual object 304 is optionally displayed with one or more user interface elements, including the first user interface object 312, the second user interface object 308, and the virtual text label 310. In some examples, the one or more user interface elements have one or more characteristics of the one or more user interface elements described above with reference to FIG. 3A. In some examples, as shown in FIG. 3D, while the virtual object 304 is displayed in the three-dimensional environment 350, the electronic device 301 rotates the virtual object 304 about a vertical axis through the virtual object 304, as represented by arrow 372D.

In some examples, while the virtual object 304 is displayed in the head locked orientation in the three-dimensional environment 350, the electronic device 301 displays the one or more user interface elements relative to the head of the user. For example, in FIG. 3A, the electronic device 301 displays the first user interface object 312, the second user interface object 308, and the virtual text label 310 at unique positions in the three-dimensional environment 350 at fixed distance and orientation offsets relative to the head of the user. Accordingly, as discussed in more detail below, if the virtual object 304 is moved within the three-dimensional environment 350, the one or more user interface elements are optionally moved with the virtual object 304 to maintain the same distances from the virtual object 304 in the three-dimensional environment 350.

In some examples, while the virtual object 304 is displayed in the head locked orientation in the three-dimensional environment 350, the electronic device 301 moves the virtual object 304 in the three-dimensional environment 350 in accordance with movement of the viewpoint 318 of the user relative to the user's head. In FIG. 3D, the electronic device 301 optionally detects radial movement of the viewpoint 318 of the user. For example, as shown in FIG. 3D, the electronic device 301 (e.g., and thus the display generation component via which the three-dimensional environment 350 is displayed) is moved radially downward in the pitch direction, as represented by arrow 371D, in the physical environment surrounding the electronic device 301. In some examples, as similarly discussed above, the movement of the electronic device 301 downward is caused by movement of the head of the user downward in the pitch direction (e.g., because the electronic device 301 is worn on the head of the user). In some examples, the radial movement of the viewpoint 318 of the user corresponds to tilting of the head of the user toward the floor of the physical environment in which the electronic device 301 is located.

Figure 3E:
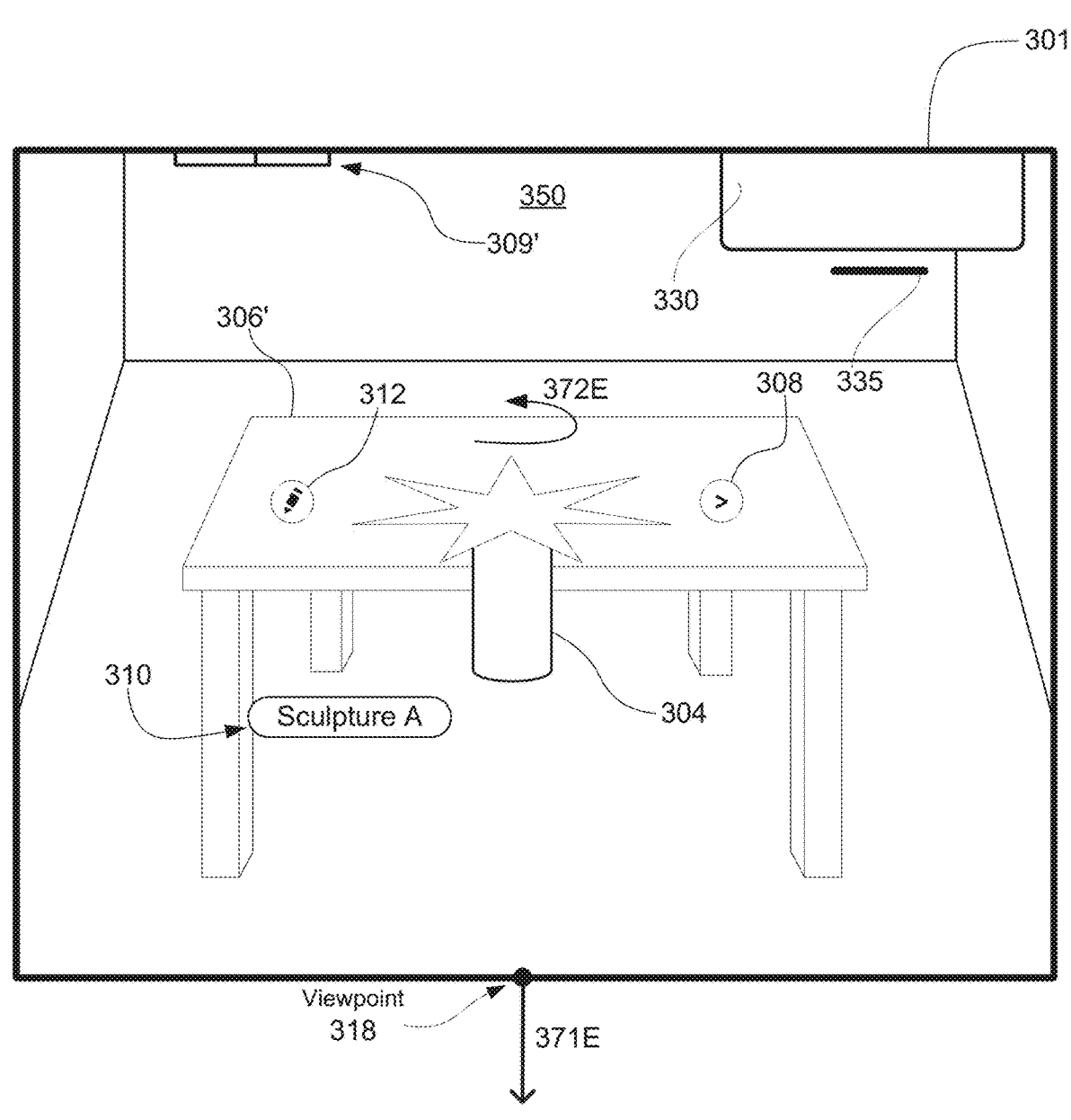

In some examples, as shown in FIG. 3E, in response to detecting the movement of the viewpoint 318 of the user of the electronic device 301, the electronic device 301 updates presentation of the three-dimensional environment 350. For example, as shown in FIG. 3E, the downward movement of the viewpoint 318 of the user causes the representation of the table 306' and the representation of the window 309' to be shifted upward in the view of the three-dimensional environment 350 for the new viewpoint of the user. Additionally, because the viewpoint 318 has moved downward in the pitch direction, a greater portion of the floor of the physical environment is optionally visible in the user's field of view of the three-dimensional environment 350, as shown in FIG. 3E.

In some examples, as previously mentioned above, in response to detecting the downward movement of the viewpoint 318 of the user, the electronic device 301 moves the virtual object 304 in the three-dimensional environment 350 based on the movement of the viewpoint 318. For example, as shown in FIG. 3E, because the virtual object 304 is head locked, the electronic device 301 moves the virtual object 304 to maintain the same distance and orientation offset relative to the head of the user in the three-dimensional environment 350. As shown in FIG. 3E, the virtual object 304 is optionally still displayed centrally in the user's field of view in the three-dimensional environment 350. On the other hand, in response to detecting the downward movement of the viewpoint 318 of the user, the electronic device 301 forgoes moving the application window 330 in the three-dimensional environment 350 based on the movement of the viewpoint 318. For example, as similarly discussed above, the application window 330 is not displayed in the three-dimensional environment 350 at the same distance or orientation offset relative to the user of the electronic device 301 as shown previously in FIG. 3D. In some examples, because the application window 330 is world locked in the three-dimensional environment 350, the application window 330 remains displayed at the same location in the three-dimensional environment 350 irrespective of the movement of the viewpoint 318. Accordingly, as shown in FIG. 3E, the application window 330 is shifted upward in the view of three-dimensional environment 350 for the new viewpoint 318 of the user.

As shown in FIG. 3E, when the viewpoint 318 of the user is moved downward in the pitch direction relative to the three-dimensional environment 350, the virtual object 304 is not rotated in the pitch direction in the three-dimensional environment 350 relative to the viewpoint 318 of the user (but is rotated in the pitch direction relative to the three-dimensional environment 350). For example, as shown in FIG. 3E, the electronic device 301 continues to rotate the virtual object 304 about a vertical axis through the virtual object 304, as represented by arrow 372E, in the three-dimensional environment 350, without rotating a top end of the virtual object 304 such that a greater portion of the top end is facing toward the viewpoint 318 of the user.

Additionally, as shown in FIG. 3E, when the electronic device 301 moves the virtual object 304 in the three-dimensional environment 350, the one or more user interface elements are also moved with the virtual object 304. For example, as shown in FIG. 3E, the electronic device 301 moves the first user interface object 312, the second user interface object 308, and the virtual text label 310 with the virtual object 304. As shown in FIG. 3E, the one or more user interface elements continue to face toward the viewpoint 318 of the user when the one or more user interface elements are moved in the three-dimensional environment 350. For example, as shown in FIG. 3E, the graphical representation (e.g., icon) that is associated with the first user interface object 312 and the second user interface object 308, and the text ("Sculpture A") of the visual text label 310 continue to be visible and front-facing relative to the viewpoint 318. As described previously above, in some examples, the one or more user interface elements are displayed at unique locations in the three-dimensional environment 350 that are at fixed distance and orientation offsets relative to the user's head when the virtual object 304 is displayed in a head locked orientation in the three-dimensional environment 350. Accordingly, as shown in FIG. 3E, as the viewpoint 318 of the user moves farther down in the pitch direction compared to the viewpoint 318 in FIG. 3E, the first user interface object 312, the second user interface object 308, and the virtual text label 310 are displayed at the same distances from the virtual object 304 in the three-dimensional environment 350 relative to the viewpoint 318 of the user.

In FIG. 3E, the electronic device 301 optionally detects further movement of the viewpoint 318 of the user. For example, as shown in FIG. 3E, the electronic device 301 is moved further downward in the pitch direction, as represented by arrow 371E, in the physical environment (e.g., due to movement of the electronic device 301 by the user (e.g., movement of the user's head)). In some examples, the further movement of the viewpoint 318 of the user corresponds to tilting of the head of the user further toward the floor of the physical environment in which the electronic device 301 is located.

Figure 3F:
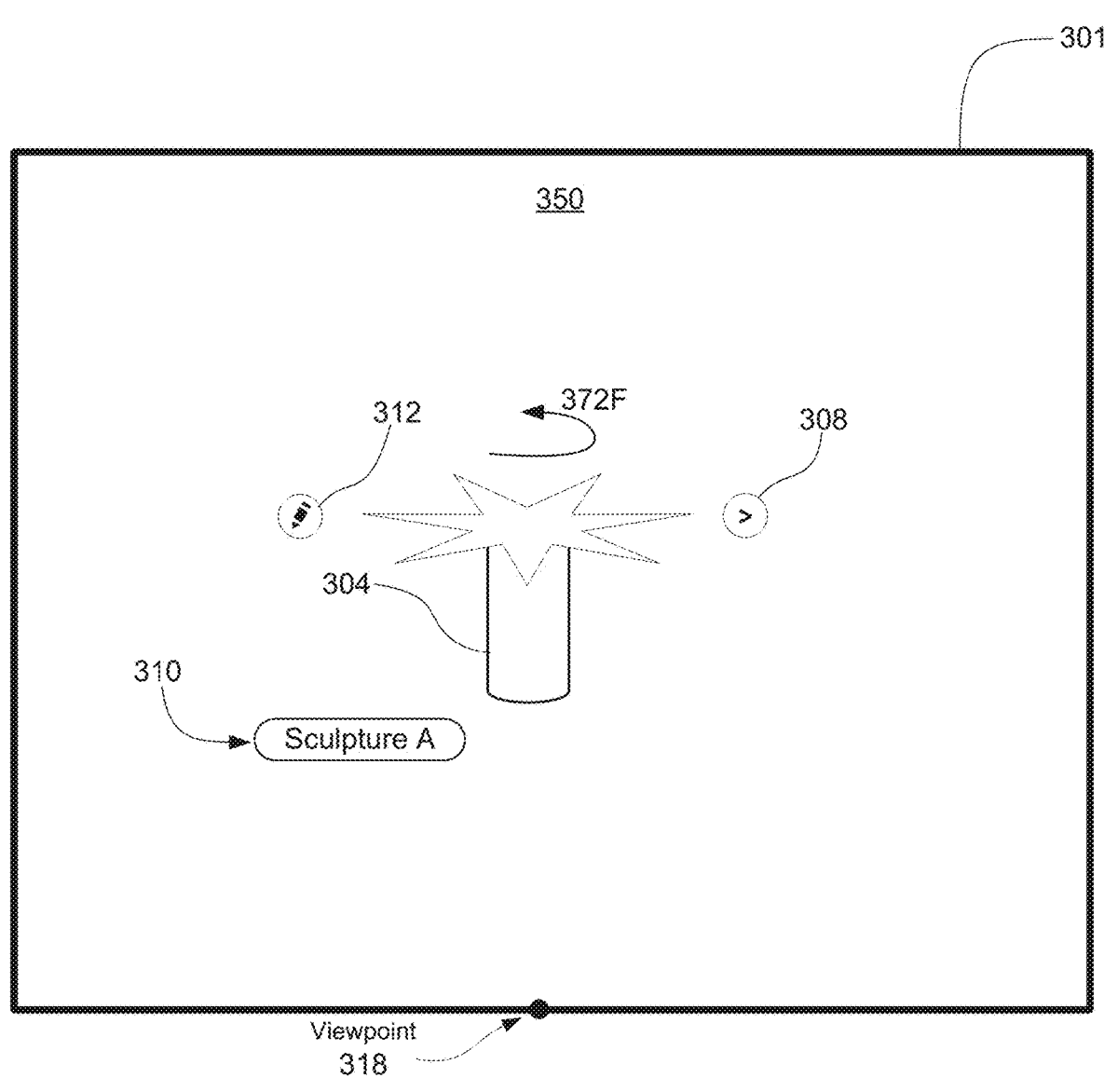

In some examples, in response to detecting the movement of the viewpoint 318 of the user, as shown in FIG. 3F, the electronic device 301 updates presentation of the three-dimensional environment 350 in accordance with the movement of the viewpoint 318. For example, as shown in FIG. 3F, the movement of the viewpoint 318 further downward in the pitch direction causes the floor of the physical environment surrounding the electronic device 301 to occupy the field of view of the user. Accordingly, as shown in FIG. 3F, the representation of the table 306' and the representation of the window 309' are no longer visible in the user's field of view of the three-dimensional environment 350 from the new viewpoint 318 of the user. Additionally, as similarly discussed above, because the application window 330 is world locked in the three-dimensional environment 350, the further movement of the viewpoint 318 downward in the pitch direction causes the application window 330 to no longer be displayed in the view of the three-dimensional environment 350 from the viewpoint 318 of the user, as shown in FIG. 3F.

As shown in FIG. 3F and as similarly described above, in response to detecting the further movement of the viewpoint 318, the electronic device 301 moves the virtual object 304 in the three-dimensional environment 350 based on the movement of the viewpoint. For example, as shown in FIG. 3F, the virtual object 304 continues to be displayed centrally in the field of view of the user in the three-dimensional environment 350 (e.g., at the same distance and orientation offset relative to the head of the user) despite the floor of the physical environment now occupying the field of view of the user relative to the new viewpoint 318. Additionally, as shown in FIG. 3F, the electronic device 301 continues to rotate the virtual object 304 about a vertical axis through the virtual object 304, as represented by arrow 372F, without rotating the virtual object 304 in the pitch direction, in response to detecting the further movement of the viewpoint 318 of the user. For example, as similarly described above, because the virtual object 304 is head locked in the three-dimensional environment 350, the side portions of the virtual object 304 continue to face toward the viewpoint 318 of the user (while the virtual object 304 rotates in the direction of the arrow 372F as discussed above) when the viewpoint 318 of the user is angled downward toward the floor of the physical environment surrounding the electronic device 301.

As similarly discussed above, when the electronic device 301 moves the virtual object 304 in the three-dimensional environment 350 based on the movement of the viewpoint 318 of the user, the electronic device 301 moves the one or more user interface elements with the virtual object 304, as shown in FIG. 3F. For example, as shown in FIG. 3F, the electronic device 301 moves the first user interface object 312, the second user interface object 308, and the virtual text label 310 with the virtual object 304 in the three-dimensional environment 350. In some examples, as shown in FIG. 3F and as previously described above, the first user interface object 312, the second user interface object 308, and the virtual text label 310 are still displayed at fixed distances from the virtual object 304 in the three-dimensional environment 350 when the virtual object 304 is head locked (e.g., irrespective of the further downward movement of the viewpoint 318). Accordingly, as shown in FIG. 3F, the one or more user interface elements are displayed with the virtual object 304 in the three-dimensional environment 350 without obscuring and/or preventing the user from viewing one or more portions of the virtual object 304 in the three-dimensional environment 350 relative to the new viewpoint 318 of the user. Accordingly, displaying the virtual object 304 in the head locked orientation in the three-dimensional environment 350 enables the user to view the virtual object 304 and the one or more user interface elements in an unobstructed and natural manner when the viewpoint 318 of the user is angled toward the ground (e.g., parallel to gravity, such as a threshold angle (e.g., 1, 5, 10, 15, 20, 30, etc. degrees) of being parallel to gravity).

While displaying the virtual object 304 in the head locked orientation in the three-dimensional environment 350 enables the one or more user interface elements to be displayed with the virtual object 304 without at least partially obscuring and/or distracting from the virtual object 304, as discussed above, when the viewpoint 318 of the user is angled toward the ground, the display of the virtual object 304 in the head locked orientation may cause the virtual object 304 to appear "stuck" in the user's field of view while the viewpoint 318 is angled toward the horizon (e.g., normal to gravity, such as a threshold angle (e.g., 1, 5, 10, 15, 20, 30, etc. degrees) of being normal to gravity). For example, as illustrated from FIGS. 3D-3E, the display of the virtual object 304 at the same distance and orientation offset relative to the viewpoint 318 of the user when the user looks straight ahead (e.g., toward the horizon) and then toward the ground (e.g., parallel to gravity) may appear unnatural to the user, particularly if the user desires to look at an object (e.g., real or virtual) that is adjacent to or behind the virtual object 304. Displaying the virtual object 304 in the tilt locked orientation may be desirable when the viewpoint 318 of the user is angled toward the horizon, as discussed above, because the virtual object 304 is optionally displayed relative to the user's torso, which enables the user to rotate their head (without rotating their torso) in the yaw direction to look at other objects in the user's field of view without causing the virtual object 304 to move in the three-dimensional environment 350. However, as illustrated in FIGS. 3B-3C, displaying the virtual object 304 in the tilt locked orientation causes, in certain instances, the one or more user interface elements to overlap with the virtual object 304 relative to the viewpoint 318 of the user when the user looks toward the ground (e.g., when the viewpoint 318 is angled parallel to gravity).

Accordingly, it may be advantageous to provide a method for seamless transition of display of the virtual object 304 between tilt locked and head locked in the three-dimensional environment 350 in response to detecting movement of the viewpoint 318 of the user. In some examples, as described below, the electronic device 301 transitions from displaying the virtual object 304 in tilt locked to head locked when the movement of the viewpoint 318 of the user exceeds a threshold movement (e.g., relative to gravity). Attention is now directed to example interactions with a virtual object that include movement of the viewpoint of the user of the electronic device while the virtual object is displayed in a particular orientation in a three-dimensional environment.

Figure 4A:
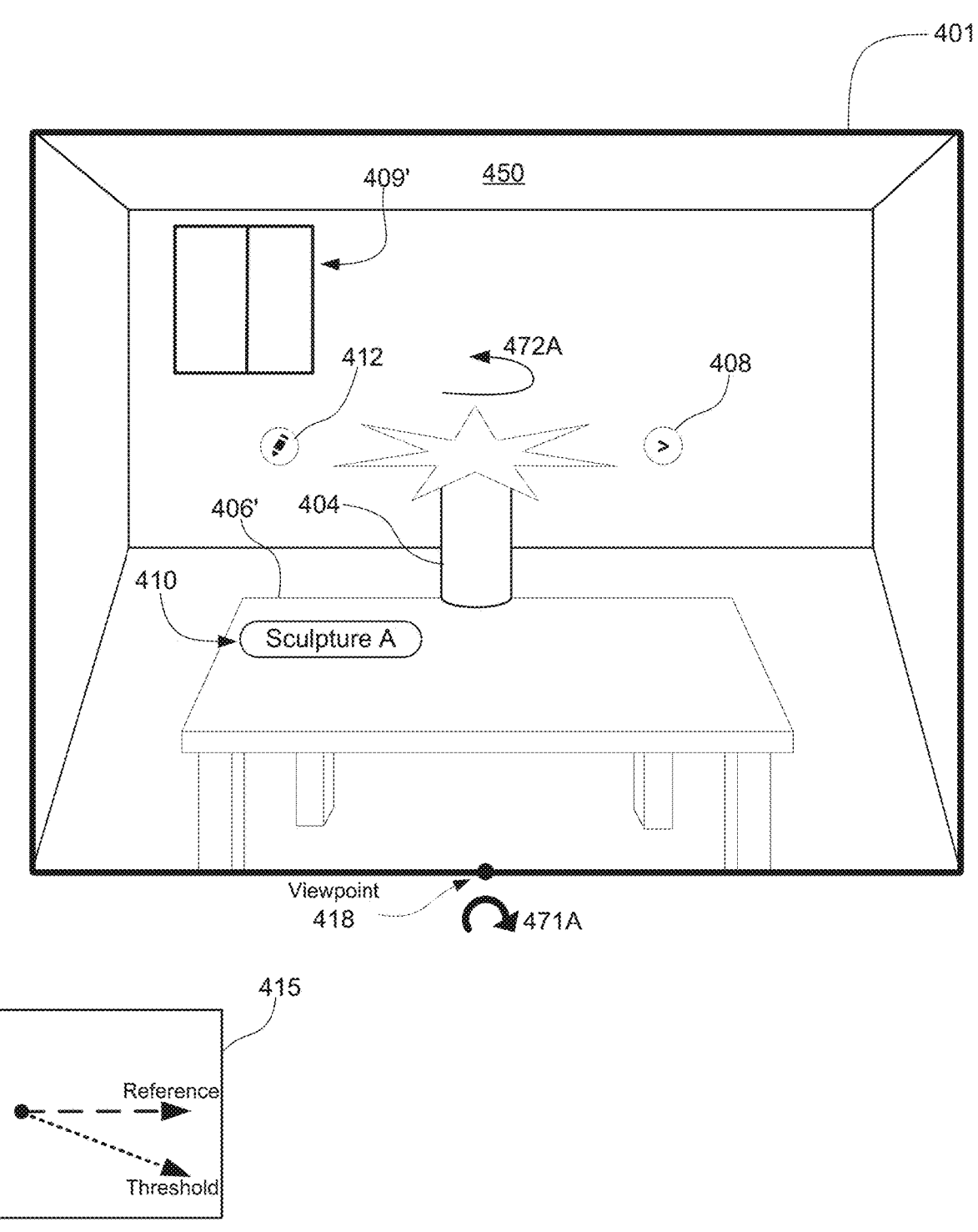
FIGS. 4A-4K illustrate example interactions for transitioning an object between tilt locked and head locked orientations in a three-dimensional environment according to some examples of the disclosure.

FIGS. 4A-4K illustrate example interactions for transitioning an object between tilt locked and head locked orientations in a three-dimensional environment according to some examples of the disclosure. In some examples, as shown in FIG. 4A, a three-dimensional environment 450 may be presented using electronic device 401. In some examples, the electronic device 401 optionally corresponds to electronic device 301 discussed above. In some examples, the three-dimensional environment 450 includes captured portions of the physical environment in which electronic device 401 is located. For example, the three-dimensional environment 450 optionally includes a table (e.g., a representation of table 406') and a window (e.g., representation of window 409'), as shown in FIG. 4A. In some examples, the three-dimensional environment 450 optionally corresponds to three-dimensional environment 350 described above. In some examples, the representations of the physical environment can include portions of the physical environment viewed through a transparent or translucent display of electronic device 401.

As similarly discussed above, in some examples, the three-dimensional environment 450 may include one or more virtual objects that are displayed with a particular orientation relative to a viewpoint of a user of the electronic device 401. For example, as shown in FIG. 4A, the three-dimensional environment 450 at the electronic device 401 may include virtual object 404, which is optionally a virtual sculpture associated with a content creation application running on the electronic device 401. In some examples, the virtual object 404 corresponds to virtual object 304 described above. Additionally, as shown in FIG. 4A, while the electronic device 401 is displaying the virtual object 404 in the three-dimensional environment 450, the electronic device 401 optionally rotates the virtual object 404 about a vertical axis through the virtual object 404 relative to the viewpoint 418 of the user, as represented by arrow 472A, as similarly discussed above.

Additionally, in some examples, as shown in FIG. 4A, the three-dimensional environment 450 may include one or more user interface elements that are displayed with the virtual object 404. For example, as shown in FIG. 4A, the virtual object 404 is displayed with a first user interface object 412, a second user interface object 408, and a virtual text label 410. In some examples, as shown in FIG. 4A, the one or more user interface elements are displayed with an orientation that is configured to face toward the viewpoint 418 of the user of the electronic device 401. For example, the graphical representations (e.g., icons, text, etc.) included in the first user interface object 412, the second user interface object 408, and the virtual text label 410 are configured to face toward the viewpoint 418 of the user in the three-dimensional environment 450. In some examples, the one or more user interface elements correspond to the one or more user interface elements described previously above.

In some examples, as similarly described herein above, the virtual object 404 may be displayed in a particular orientation in the three-dimensional environment 450. For example, the virtual object 404 may be displayed in a body locked, head locked, tilt locked, or world locked orientation in the three-dimensional environment 450. In some examples, as previously discussed above, displaying the virtual object 404 in only one of these orientations in the three-dimensional environment 450 may not enable the user to efficiently and continuously view the virtual object 404 when the viewpoint 418 of the user changes. For example, as previously discussed above, if the virtual object 404 is world locked in the three-dimensional environment 450, movement of the viewpoint 418 may cause the virtual object 404 to no longer be displayed in the portion of the three-dimensional environment 450 that is in the user's new field of view (e.g., as similarly shown by application window 330 in FIGS. 3A-3F). In some examples, if the virtual object 404 is tilt locked in the three-dimensional environment 450, movement of the viewpoint 418 (e.g., to be angled toward a ground of the physical environment surrounding the electronic device 401) may cause the virtual object 404 to become obstructed and/or distracted from by the one or more user interface elements displayed with the virtual object 404 (e.g., as similarly shown in FIGS. 3B-3C). In some examples, if the virtual object 404 is head locked in the three-dimensional environment 450, the display of the virtual object 404 may appear visually unnatural (e.g., "stuck" in the user's field of view) and/or distracting from the viewpoint 418 of the user because the virtual object 404 as the viewpoint of the user moves laterally (e.g., as similarly shown in FIGS. 3A-3C).

Accordingly, in some examples, the display of the virtual object 404 in the three-dimensional environment 450 may be transitioned between tilt locked and head locked to provide a seamless and continuous viewing experience of the virtual object 404 despite movement of the viewpoint 418 of the user. In some examples, the electronic device 401 transitions between displaying the virtual object 404 in tilt locked and head locked in the three-dimensional environment 450 in response to detecting movement of the viewpoint 418 of the user beyond a threshold movement (e.g., an angular threshold, as discussed in more detail below), as represented by "Threshold" arrow in legend 415, relative to a reference ray, as represented by "Reference" arrow in the legend 415, in the pitch direction. In some examples, if the movement of the viewpoint 418 does not exceed the threshold movement, the electronic device 401 maintains display of the virtual object 404 in the current orientation (e.g., tilt locked or head locked orientation).

In FIG. 4A, the electronic device 401 optionally detects (e.g., radial) movement of the viewpoint 418 of the user while the virtual object 404 is displayed in the tilt locked orientation within the three-dimensional environment 450. For example, as shown in FIG. 4A, the electronic device 401 detects movement of the viewpoint 418 rightward (e.g., clockwise) in the roll orientation relative to the three-dimensional environment 450, as represented by arrow 471A. In some examples, as similarly discussed herein, the movement of the viewpoint 418 of the user corresponds to movement of the electronic device 401 (e.g., including the display generation component of the electronic device 401) rightward in the roll orientation in the physical environment surrounding the electronic device 401. In some examples, the movement of the electronic device 401 is caused by rightward tilt of the electronic device 401 in the roll direction by the user wearing the electronic device 401 (e.g., on a head of the user, as similarly discussed above).

Figure 4B:
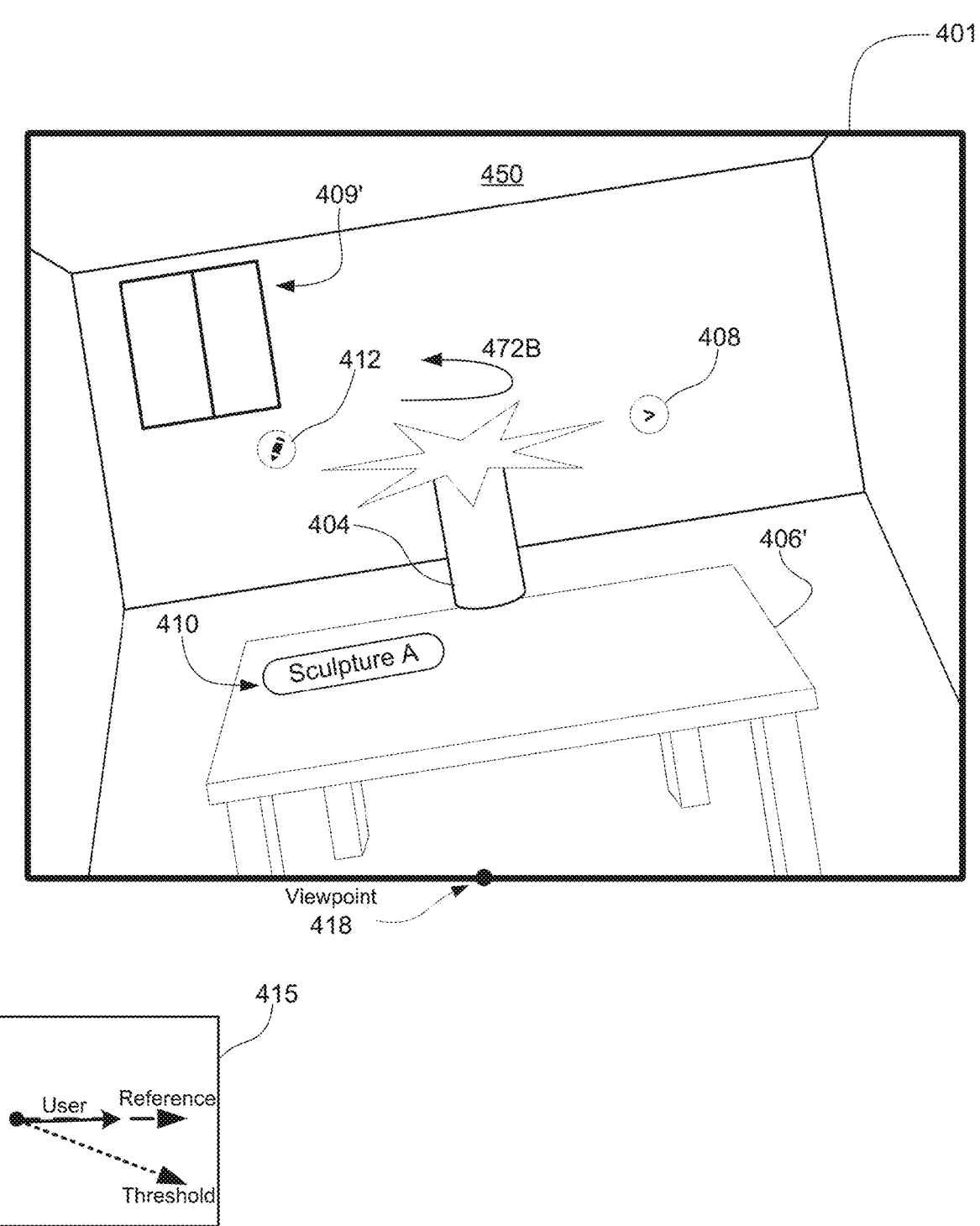
Figure 4C:
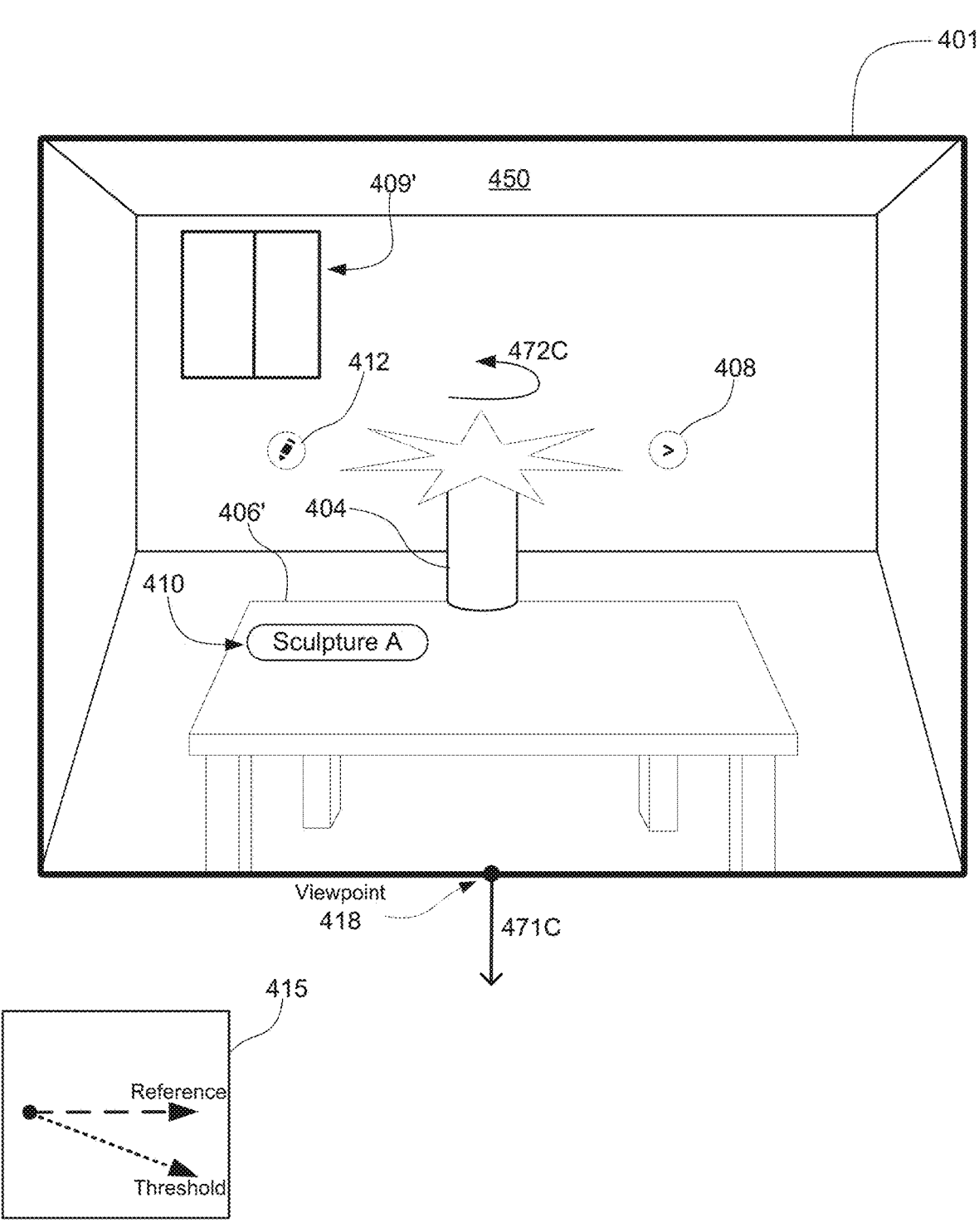

In some examples, in response to detecting the movement of the viewpoint 418 of the user rightward in the roll direction, the electronic device 401 updates presentation of the three-dimensional environment 450 based on the movement of the viewpoint 418. For example, as shown in FIG. 4B, the view of the physical environment that is visible in the three-dimensional environment 450 is rotated counterclockwise, including the representation of the table 406' and the representation of the window 409'. Additionally, as shown in FIG. 4B, the view of the floor, ceiling, and walls of the physical environment surrounding the electronic device 401 are optionally shifted/rotated counterclockwise in the field of view of the user of the electronic device 401 relative to the viewpoint 418.

In some examples, as mentioned above, in response to detecting the movement of the viewpoint 418 of the user, if the movement of the viewpoint 418 exceeds the threshold movement, the electronic device 401 transitions from displaying the virtual object 404 in the tilt locked orientation to displaying the virtual object 404 in the head locked orientation. In some examples, the reference against which the threshold movement is measured corresponds to a ray intersecting the horizon of the field of view of the user (e.g., a ray extending away from the viewpoint 418 of the user straight toward the back wall of the physical environment surrounding the electronic device 401). In some examples, as illustrated in the legend 415 in FIG. 4B, the reference ray is normal to the force of gravity. In some examples, as mentioned above, the threshold movement corresponds to an angular threshold. For example, the movement of the viewpoint 418 exceeds the threshold movement if the electronic device 401 detects movement of the viewpoint 418 beyond −10, 15, 20, 25, 30, 35, etc. degrees in the pitch direction relative to the reference ray (e.g., illustrated in the legend 415). It should be understood that, in some examples, the threshold movement may correspond to additional or alternative thresholds, such as distance thresholds, time thresholds, speed thresholds, or movements in other directions relative to the ray (e.g., yaw or roll), etc.

In some examples, as shown in FIG. 4B, in response to detecting the movement of the viewpoint 418 clockwise in the roll direction, the electronic device 401 determines that the movement of the viewpoint 418 does not exceed the threshold movement (e.g., the angular threshold illustrated in the legend 415). For example, as illustrated by "User" arrow in the legend 415, the viewpoint 418 of the user is still directed toward the horizon of the field of view of the user after the movement of the viewpoint 418, and thus is not directed at or beyond the threshold ray in the legend 415. In some examples, in accordance with the determination that the movement of the viewpoint 418 does not exceed the threshold movement, the electronic device 401 maintains display of the virtual object 404 in the tilt locked orientation in the three-dimensional environment 450. For example, as shown in FIG. 4B, the electronic device 401 rotates the virtual object 404 counterclockwise in the view of the three-dimensional environment 450 (e.g., similar to the representations of the table 406' and the window 409'), such that the virtual object 404 continues to be displayed at the same distance and/or orientation offset relative to the user's torso in the three-dimensional environment 450 from the viewpoint 418. Additionally, as shown in FIG. 4B, the electronic device 401 optionally continues to rotate the virtual object 404 about a vertical axis through the virtual object 404, as represented by arrow 472B, relative to the viewpoint 418 of the user.

In some examples, as similarly discussed herein above, the electronic device 401 moves the one or more user interface elements with the virtual object 404 based on the movement of the viewpoint 418 of the user. As previously discussed herein, in some examples, while the virtual object 404 is displayed in the tilt locked orientation in the three-dimensional environment 450, the one or more user interface elements are displayed at unique locations in the three-dimensional environment 450 relative to a pole through the user's torso (e.g., according to a polar coordinate system). Accordingly, the rightward movement of the viewpoint 418 in the roll direction in FIG. 4A does not cause the user's torso to move in the physical environment, and thus the one or more user interface elements remain displayed at the same distance and/or orientation offset relative to the user's torso in FIG. 4B as shown previously in FIG. 4A. For example, as shown in FIG. 4B, the electronic device 401 rotates the first user interface object 412, the second user interface object 408, and the virtual text label 410 counterclockwise with the virtual object 404 in the view of the three-dimensional environment 450 (e.g., similar to the representations of the table 406' and the window 409', but does not rotate them relative to three-dimensional environment 450).

Accordingly, as discussed above with reference to FIGS. 4A-4B, movement of the viewpoint 418 of the user in the roll direction (e.g., leftward or rightward) does not cause the movement of the viewpoint 418 to exceed the threshold movement described above (e.g., the threshold ray in the legend 415). Accordingly, in some examples, when the electronic device 401 is moved counterclockwise or clockwise in the roll direction in the physical environment surrounding the electronic device 401 (e.g., caused by movement of the head of the user wearing the electronic device 401), the electronic device 401 maintains display of the virtual object 404 in the tilt locked orientation in the three-dimensional environment 450.

In some examples, the viewpoint 418 of the user may alternatively be moved in the pitch direction relative to the three-dimensional environment 450. For example, in FIG. 4C, while the virtual object 404 is displayed in the tilt locked orientation in the three-dimensional environment 450, the electronic device 401 detects (e.g., radial) movement of the viewpoint 418 of the user downward in the pitch direction, as represented by arrow 471C. In some examples, as similarly discussed above, the movement of the viewpoint 418 of the user may correspond to movement of the electronic device 401 (e.g., including the display generation component of the electronic device 401) downward in the pitch direction and directed toward the ground of the physical environment surrounding the electronic device 401.

Figure 4D:
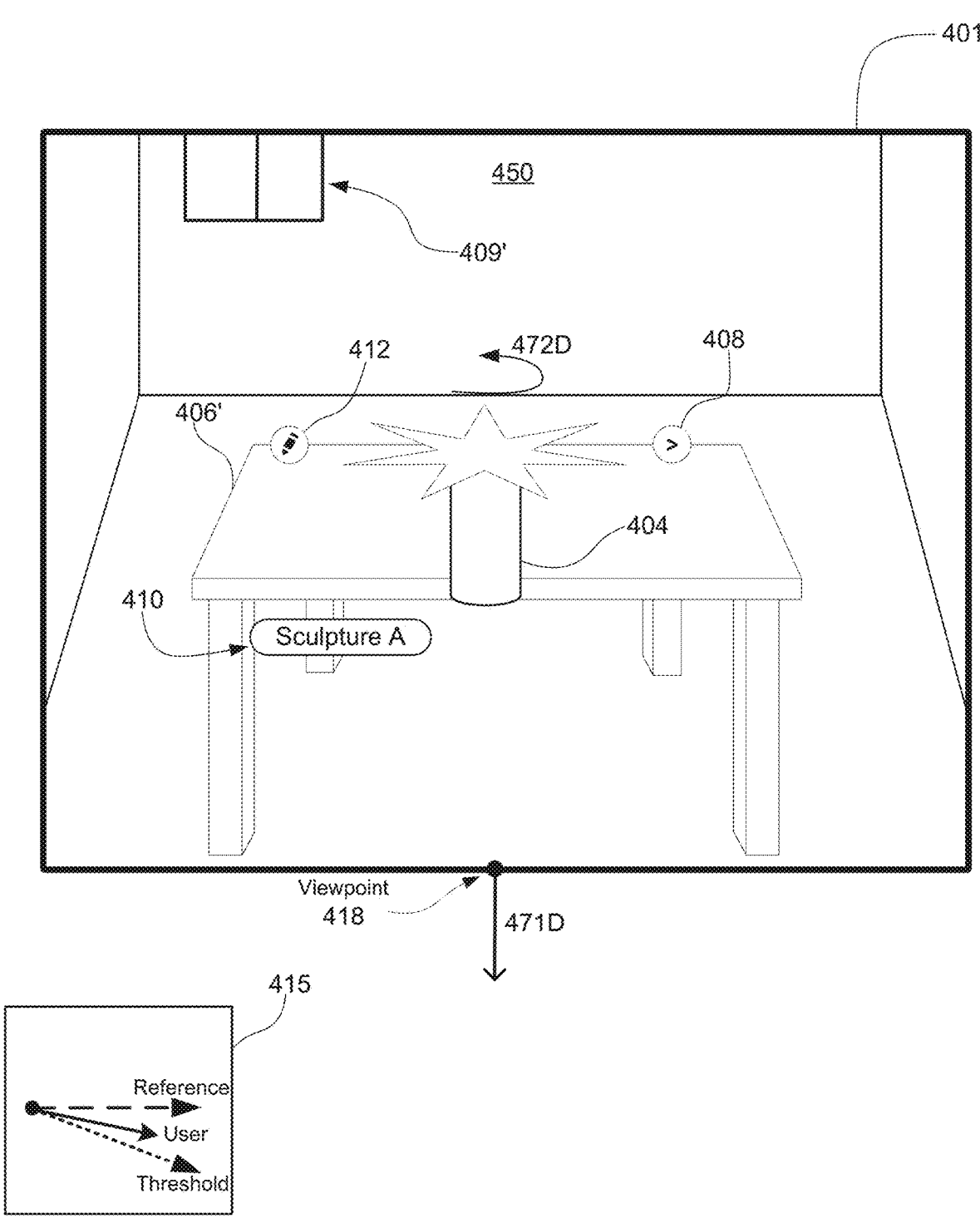

In some examples, in response to detecting the movement of the viewpoint 418 of the user in the pitch direction, the electronic device 401 updates presentation of the three-dimensional environment 450 based on the movement of the viewpoint 418. For example, as shown in FIG. 4D, the representations of the table 406' and the window 409' are shifted upward in the view of the three-dimensional environment 450 in accordance with the movement of the viewpoint 418 downward in the pitch direction. Additionally, as shown in FIG. 4D, the viewpoint 418 of the user is angled downward toward a portion of the ground of the physical environment surrounding the electronic device 401. Accordingly, in FIG. 4D, a greater portion of the ground/floor of the physical environment is visible in the field of view of the user.

In some examples, as similarly discussed above, in response to detecting the movement of the viewpoint 418 of the user downward in the pitch direction, the electronic device 401 determines whether the movement of the viewpoint 418 exceeds the threshold movement discussed above. For example, as shown in FIG. 4D, the viewpoint 418 of the user is angled downward toward a portion of the ground/floor of the physical environment that is visible in the field of view of the user. As illustrated in the legend 415 in FIG. 4D, the user ray has not crossed the threshold ray relative to the reference ray, and thus the movement of the viewpoint 418 of the user in FIG. 4C does not exceed the threshold movement (e.g., the angular threshold) described above. In some examples, as similarly discussed above, in accordance with a determination that the movement of the viewpoint 418 of the user downward in the pitch direction does not exceed the threshold movement, the electronic device 401 maintains display of the virtual object 404 in the tilt locked orientation in the three-dimensional environment 450. For example, as shown in FIG. 4D, the electronic device 401 moves the virtual object 404 in the view of the three-dimensional environment 450 based on the movement of the viewpoint 418 of the user. As similarly discussed above, the virtual object 404 optionally continues to be displayed centrally in the field of view of the user and upright (e.g., such that the side portions of the virtual object 404 continue to face toward the viewpoint 418 of the user) and the virtual object 404 optionally is not shifted upward in the view of the three-dimensional environment 450 like the representations of the table 406' and the window 409'. Additionally, as shown in FIG. 4D, the electronic device 401 optionally continues to rotate the virtual object 404 (e.g., in the yaw direction) about a vertical axis through the virtual object 404, as represented by arrow 472D, relative to the viewpoint 418 of the user.

In some examples, as similarly discussed herein above, the electronic device 401 moves the one or more user interface elements with the virtual object 404 based on the movement of the viewpoint 418 of the user. As previously discussed herein, in some examples, while the virtual object 404 is displayed in the tilt locked orientation in the three-dimensional environment 450, the one or more user interface elements are displayed at unique locations in the three-dimensional environment 450 relative to a pole through the user's torso (e.g., according to a polar coordinate system). Accordingly, the downward movement of the viewpoint 418 in the pitch direction in FIG. 4C does not cause the user's torso to move in the physical environment, and thus the one or more user interface elements remain displayed at the same distance and/or orientation offset relative to the user's torso in FIG. 4D as shown previously in FIG. 4C. For example, as shown in FIG. 4D, the electronic device 401 maintains display of the first user interface object 412, the second user interface object 408, and the virtual text label 410 with the virtual object 404 in a central and upright orientation in the three-dimensional environment 450, such that the first user interface object 412, the second user interface object 408, and the virtual text label 410 are not shifted upward in the field of view of the three-dimensional environment 450 like the representations of the table 406' and the window 409'.

In FIG. 4D, the electronic device 401 detects further movement of the viewpoint 418 of the user downward in the pitch direction, as represented by arrow 471D. For example, as similarly discussed above, while the virtual object 404 is displayed in the tilt locked orientation in the three-dimensional environment 450, the electronic device 401 (e.g., including the display generation component of the electronic device 401) is moved further downward in the pitch direction in the physical environment surrounding the electronic device 401 (e.g., by the user wearing the electronic device 401). In some examples, as previously discussed above, the downward movement of the viewpoint 418 of the user may correspond to tilting of the head of the user in the pitch direction to be directed more toward the ground/floor of the physical environment than in FIG. 4D.

Figure 4E:
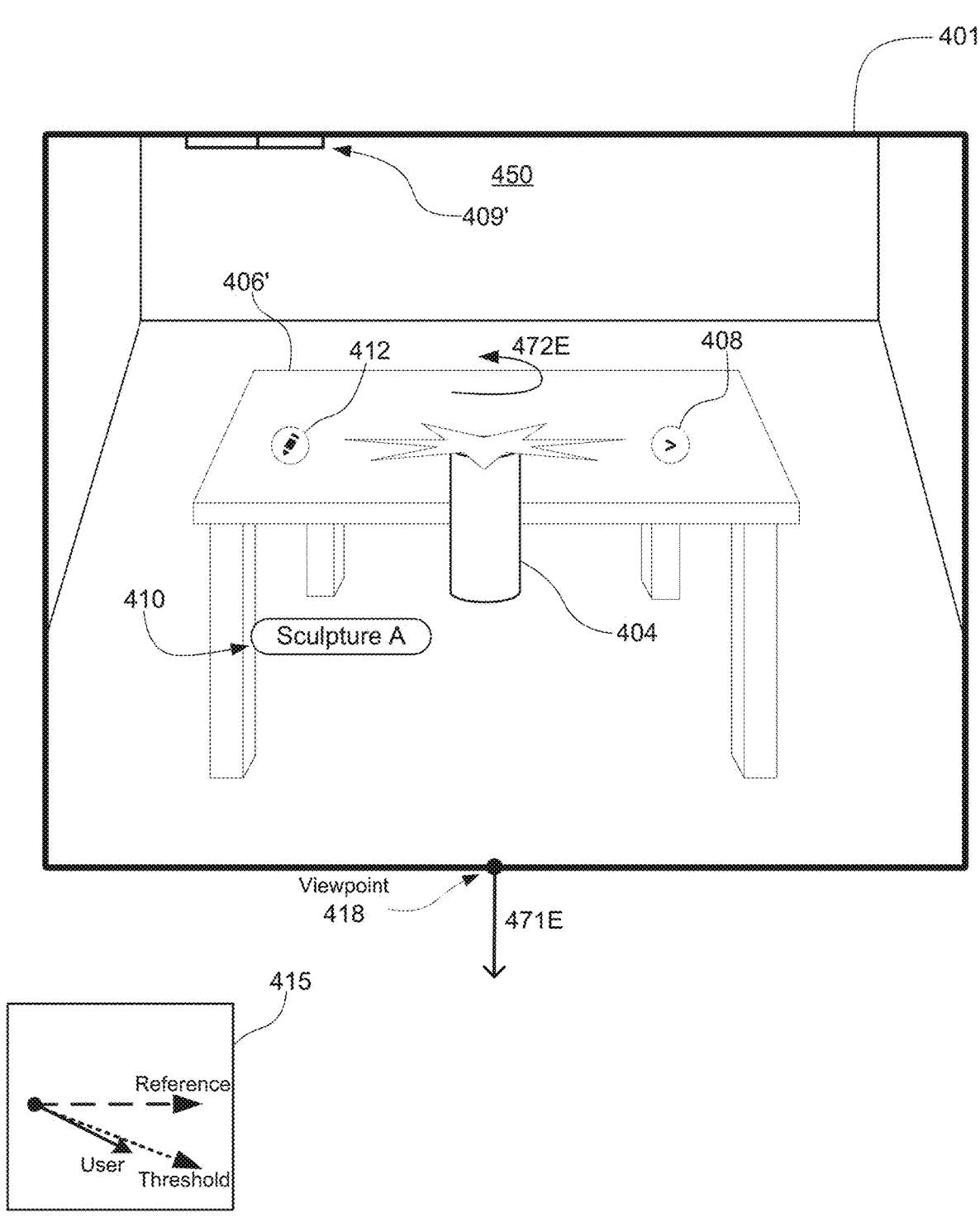

In some examples, the electronic device 401 updates presentation of the three-dimensional environment 450 based on the movement of the viewpoint 418 downward in the pitch direction. For example, as shown in FIG. 4E, the representation of the table 406' and the representation of the window 409' are shifted farther up in the view of the three-dimensional environment 450 in accordance with the movement of the viewpoint 418. Additionally, as shown in FIG. 4E, a greater portion of the floor of the physical environment surrounding the electronic device 401 is visible in the field of view of the user after the movement of the viewpoint 418 downward in the pitch direction than in FIG. 4D.

In some examples, as shown in FIG. 4E, in response to detecting the further movement of the viewpoint 418 of the user, the electronic device 401 determines that the movement of the viewpoint 418 exceeds the threshold movement (e.g., the angular threshold) discussed above. For example, as shown in FIG. 4E, the movement of the viewpoint 418 further downward in the pitch direction causes the viewpoint 418 of the user to exceed the angular threshold, as represented by the user ray crossing the threshold ray relative to the reference ray in the legend 415. In some examples, in accordance with the determination that the movement of the viewpoint 418 of the user exceeds the threshold movement discussed above, the electronic device 401 transitions from displaying the virtual object 404 in the tilt locked orientation to displaying the virtual object 404 in the head locked orientation in the three-dimensional environment 450, as described in more detail below.

In some examples, transitioning from displaying the virtual object 404 in the tilt locked orientation to displaying the virtual object 404 in the head locked orientation includes displaying an animation of a tilting/rotating, translating, or a combination thereof, of the virtual object 404 in the three-dimensional environment 450 between the pose of the virtual object 404 as defined using the tilt locked orientation and the pose of the virtual object 404 as defined using the head locked orientation. For example, in FIG. 4E, the electronic device 401 transitions from displaying the virtual object 404 relative to the user's torso to displaying the virtual object 404 relative to the user's head in the three-dimensional environment 450. In some examples, as shown in FIG. 4E, when the electronic device 401 makes this transition, the virtual object 404 is tilted/angled slightly in the pitch direction in the three-dimensional environment 450. For example, as shown in FIG. 4E, the electronic device 401 tilts/angles the virtual object 404 clockwise (e.g., upward) in the pitch direction relative to the viewpoint 418 of the user when the movement of the viewpoint 418 exceeds the threshold movement (e.g., when the user ray crosses the threshold ray relative to the reference ray in the legend 415). As shown in FIG. 4E, a greater portion of the side of the virtual object 404 and a lesser portion of the top end of the virtual object 404 optionally are visible in the three-dimensional environment 450 during the transition from tilt locked to head locked. In some examples, as shown in FIG. 4E, the electronic device 401 maintains display of the one or more user interface elements in the three-dimensional environment 450 in the polar coordinate system as the electronic device 401 transitions the virtual object 404 from tilt locked to head locked in the three-dimensional environment 450. For example, as shown in FIG. 4E, the first user interface object 412, the second user interface object 408, and the virtual text label 410 remain facing toward the viewpoint 418 of the user and at the same distance offset relative to the user's torso as the virtual object 404 is tilted/angled during the transition. In some examples, the first user interface object 412, the second user interface object 408, and the virtual text label 410 are also transitioned to being displayed in the head locked orientation with the virtual object 406 in the three-dimensional environment 450. In some examples, the electronic device 401 transitions from displaying the virtual object 404 tilt locked to head locked over a predetermined amount of time (e.g., 0.25, 0.5, 0.75, 1, 2, 3, 5, etc. seconds) from when the electronic device 401 determines that the movement of the viewpoint 418 exceeds the threshold movement.

In some examples, the electronic device 401 transitions from displaying the virtual object 404 in the tilt locked orientation to displaying the virtual object 404 in the head locked orientation without tilting/angling the virtual object 404 in the three-dimensional environment 450 in the manner shown in FIG. 4E. For example, when the movement of the viewpoint 418 of the user exceeds the movement threshold (e.g., the angular threshold), the electronic device 401 transitions from displaying the virtual object 404 relative to the user's torso to displaying the virtual object 404 relative to the user's head without displaying a visual (e.g., notice-able) change in appearance (e.g., orientation) of the virtual object 404 in the three-dimensional environment 450.

In FIG. 4E, the viewpoint 418 of the user continues to move downward in the pitch direction relative to the three-dimensional environment 450. For example, as shown in FIG. 4E, after the movement of the viewpoint 418 has exceeded the threshold movement (e.g., the angular threshold), the electronic device 401 detects the viewpoint 418 of the user continue to move downward in the pitch direction, as represented by arrow 471E. In some examples, as similarly discussed above, the head of the user (e.g., wearing the electronic device 401) tilts further downward in the pitch direction, such that the viewpoint 418 of the user is angled toward a greater portion of the floor of the physical environment than in FIG. 4E.

Figure 4F:
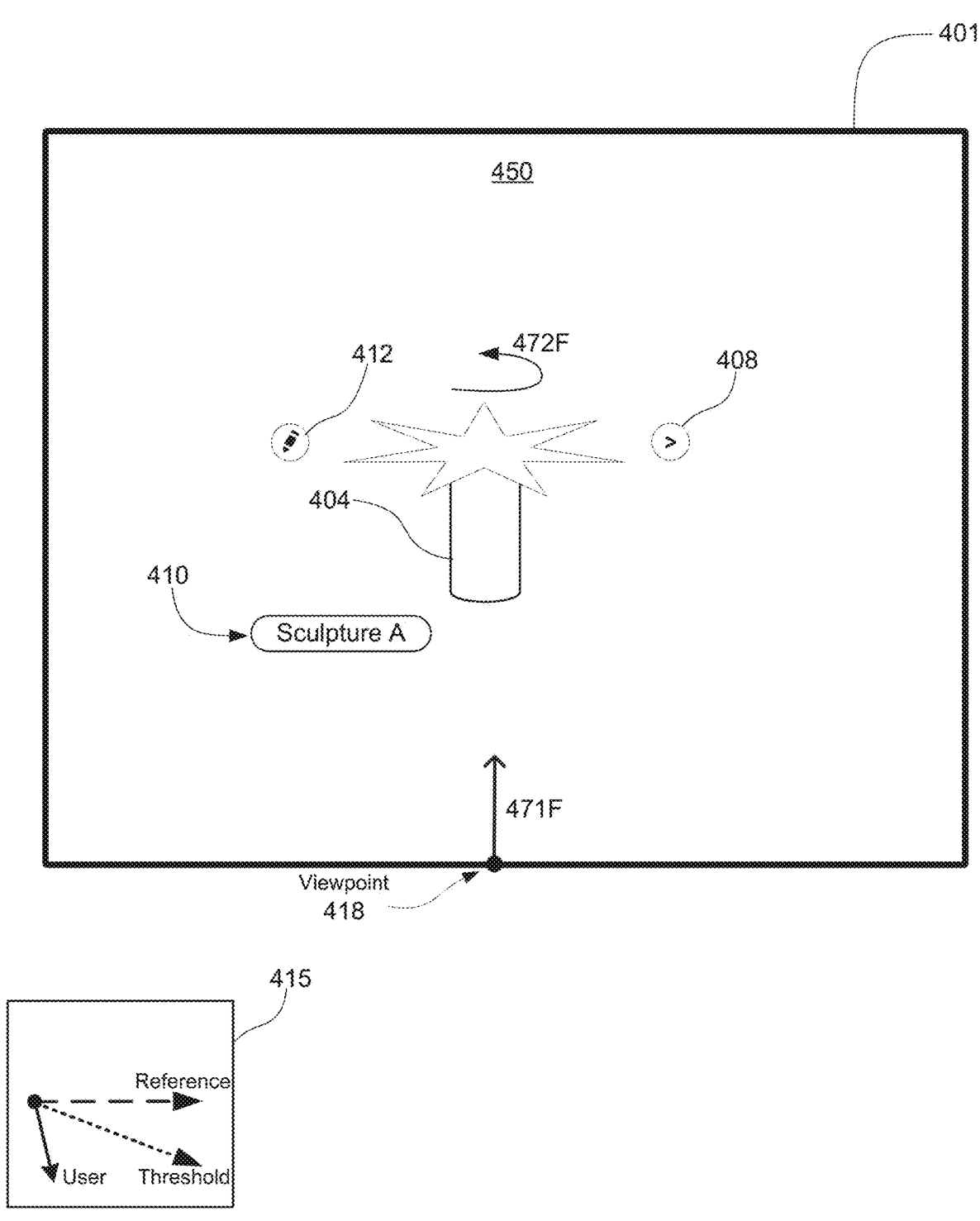

In some examples, as shown in FIG. 4F, in response to detecting the further movement of the viewpoint 418 downward in the pitch direction, the electronic device 401 updates presentation of the three-dimensional environment 450 based on the movement of the viewpoint 418. For example, as shown in FIG. 4F, the movement of the viewpoint 418 further downward in the pitch direction causes the floor of the physical environment surrounding the electronic device 401 to occupy the field of view of the user. Accordingly, as shown in FIG. 4F, the representation of the table 406' and the representation of the window 409' are no longer visible in the view of the three-dimensional environment 450 from the new viewpoint 418 of the user.

In some examples, as shown in FIG. 4F, when the viewpoint 418 of the user is moved further downward in the pitch direction, the electronic device 401 completes the transition from displaying the virtual object 404 in the tilt locked orientation to displaying the virtual object 404 in the head locked orientation. For example, as shown in FIG. 4F, the virtual object 404 is displayed in the head locked orientation in the three-dimensional environment 450 because the movement of the viewpoint 418 of the user has exceeded the movement threshold (e.g., the angular threshold) described above, as indicated by the user ray in the legend 415. Additionally, as shown in FIG. 4F, the electronic device 401 continues to rotate the virtual object 404 about a vertical axis through the virtual object 404 in the three-dimensional environment 450, as represented by arrow 472F.

As similarly discussed above, the electronic device 401 optionally moves the one or more user interface elements with the virtual object 404 in the three-dimensional environment 450 based on the movement of the viewpoint 418. In FIG. 4F, because the virtual object 404 is displayed in the head locked orientation in the three-dimensional environment 450, the electronic device 401 displays the one or more user interface elements at fixed distance and orientation offsets relative to the user's head, as previously discussed herein. Accordingly, as shown in FIG. 4F, the electronic device 401 first user interface object 412, the second user interface object 408, and the virtual text label 410 are not obscuring and/or distracting from the virtual object 404 in the three-dimensional environment 450 when the virtual object 404 is displayed in the head locked orientation. Accordingly, as described above, transitioning from displaying the virtual object 404 in the tilt locked orientation to displaying the virtual object 404 in the head locked orientation in the three-dimensional environment 450 in response to detecting movement of the viewpoint 418 of the user that exceeds the movement threshold (e.g., the angular threshold) enables the virtual object 404 to be viewed and/or interacted with in an unobscured manner irrespective of a direction of the viewpoint 418 in the three-dimensional environment 450.

In FIG. 4F, the electronic device 401 detects (e.g., radial) movement of the viewpoint 418 of the user upward in the pitch direction relative to the three-dimensional environment 450. For example, as shown in FIG. 4F, while the virtual object 404 is displayed in the head locked orientation in the three-dimensional environment 450 and the floor of the physical environment surrounding the electronic device 401 is occupying the field of view of the user, the electronic device 401 is moved upward in the pitch direction in the physical environment surrounding the electronic device 401. In some examples, as similarly discussed above, the movement of the viewpoint 418 of the user upward in the pitch direction corresponds to upward tilt of the head of the user in the pitch direction away from the floor of the physical environment.

Figure 4G:
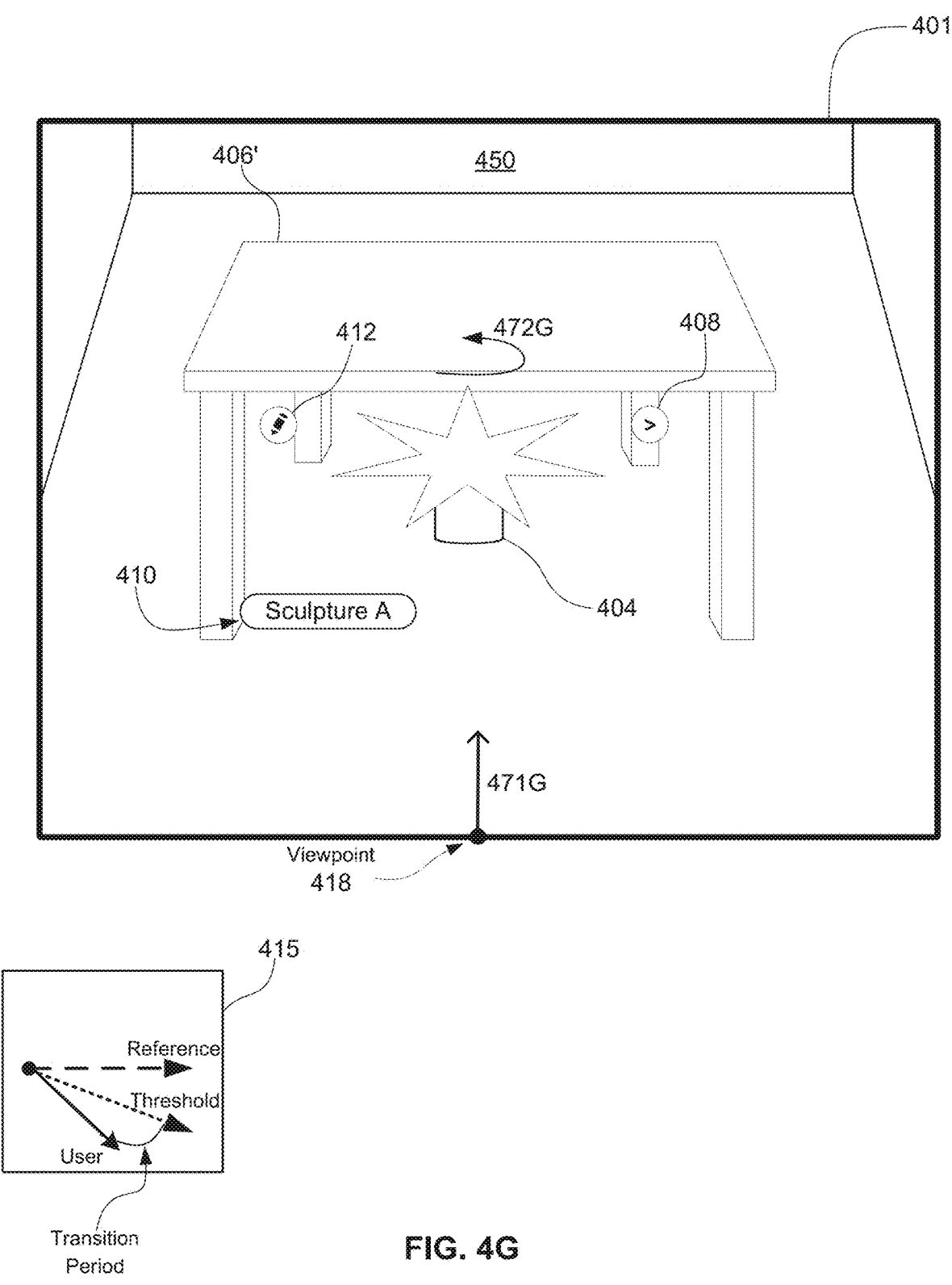

In some examples, as shown in FIG. 4G, in response to detecting the movement of the viewpoint 418 of the user upward in the pitch direction, the electronic device 401 updates presentation of the three-dimensional environment 450 based on the movement of the viewpoint 418. For example, as shown in FIG. 4G, the upward movement of the electronic device 401 has caused a portion of the walls of the physical environment surrounding the electronic device 401 to be visible again in the field of view of the user. Additionally, as shown in FIG. 4G, in response to detecting the upward movement of the viewpoint 418, the representation of the table 406' is presented in the view of the three-dimensional environment 450 (e.g., because the real-world table is visible again in the field of view of the user) relative to the viewpoint 418.

In some examples, as similarly discussed above, in response to detecting the upward movement of the viewpoint 418, the electronic device 401 determines whether the upward movement of the viewpoint 418 exceeds the movement threshold (e.g., the angular threshold) discussed above. For example, as shown in FIG. 4G, while the viewpoint 418, represented by the user ray in the legend 415, has moved upward toward the reference ray intersecting the horizon of the field of view of the user, the viewpoint 418 has not crossed the angular threshold, represented by the threshold ray in the legend 415. Accordingly, in some examples, the electronic device maintains display of the virtual object 404 in the head locked orientation in the three-dimensional environment 450. Additionally, as shown in FIG. 4G, because the virtual object 404 is still head locked in the three-dimensional environment 450, the first user interface object 412, the second user interface object 408, and the virtual text label 410 remain displayed relative to the head of the user in the three-dimensional environment 450. For example, the first user interface object 412, the second user interface object 408, and the virtual text label 410 remain displayed at the same distances from the virtual object 404 relative to the viewpoint 418 of the user in the three-dimensional environment 450 as in FIG. 4F.

In some examples, the electronic device 401 gradually transitions from displaying the virtual object 404 from the head locked orientation (or the tilt locked orientation) to the tilt locked orientation (or the head locked orientation) as the movement of the viewpoint 418 approaches the movement threshold. For example, the electronic device 401 gradually transitions between displaying the virtual object 404 in head locked or tilt locked to indicate a progress toward meeting the angular threshold described above. In FIG. 4G, as the viewpoint 418 of the user is moving upward in the pitch direction, as indicated by the arrow 471G, the electronic device 401 begins to tilt/angle the virtual object 404 (e.g., in the pitch direction) in the three-dimensional environment 450 as the upward movement of the viewpoint 418 approaches the movement threshold. For example, the electronic device 401 tilts/angles the virtual object 404 counterclockwise in the pitch direction relative to the viewpoint 418 of the user, such that a greater portion of the top end of the virtual object 404 is visible than the side portion of the virtual object 404, as shown in FIG. 4G.

In some examples, the electronic device 401 transitions from displaying the virtual object 404 between head locked and tilt locked in the three-dimensional environment 450 over a range of angular motion of the viewpoint 418 of the user. For example, as illustrated in the legend 415 in FIG. 4G, the electronic device 401 transitions from displaying the virtual object 404 in the head locked orientation to displaying the virtual object 404 in the tilt locked orientation over a transition period extending between the user ray and the threshold ray. In some examples, the transition period is a predetermined period of angular motion measured relative to the angular threshold (e.g., the threshold ray in the legend 415), such as 4, 5, 8, 10, 12, 15, etc. degrees of motion in the pitch direction. Accordingly, when the movement of the viewpoint 418 reaches a respective angle that is the predetermined period (e.g., 4, 5, 8, 10, 12, 15, etc. degrees) from the angular threshold, the electronic device 401 initiates transition from head locked to tilt locked for the virtual object 404, which includes tilting/angling the virtual object 404 counterclockwise in the pitch direction in the three-dimensional environment 450, as discussed above. In some examples, the virtual object 404 is tilted/angled by an amount that is based on (e.g., equal to or proportional to) the movement of the viewpoint 418 of the user over the transition period illustrated in the legend 415. For example, the electronic device 401 tilts/angles virtual object 404 counterclockwise in the three-dimensional environment 450 by a respective amount (e.g., 1, 2, 3, 4, 5, 10, etc. degrees) for each degree of angular movement of the viewpoint 418 of the user (e.g., tilting of the head of the user in the pitch direction). In some examples, while the electronic device 401 is tilting/angling the virtual object 404 in the three-dimensional environment 450, as shown in FIG. 4G, the electronic device 401 maintains display of the one or more user interface elements relative to the head of the user. For example, as shown in FIG. 4G, the electronic device 401 maintains display of the first user interface object 412, the second user interface object 408, and the virtual text label 410 at the fixed distances from the virtual object 404 in the three-dimensional environment 450, without tilting/angling the first user interface object 412, the second user interface object 408, and the virtual text label 410.

Figure 4H:
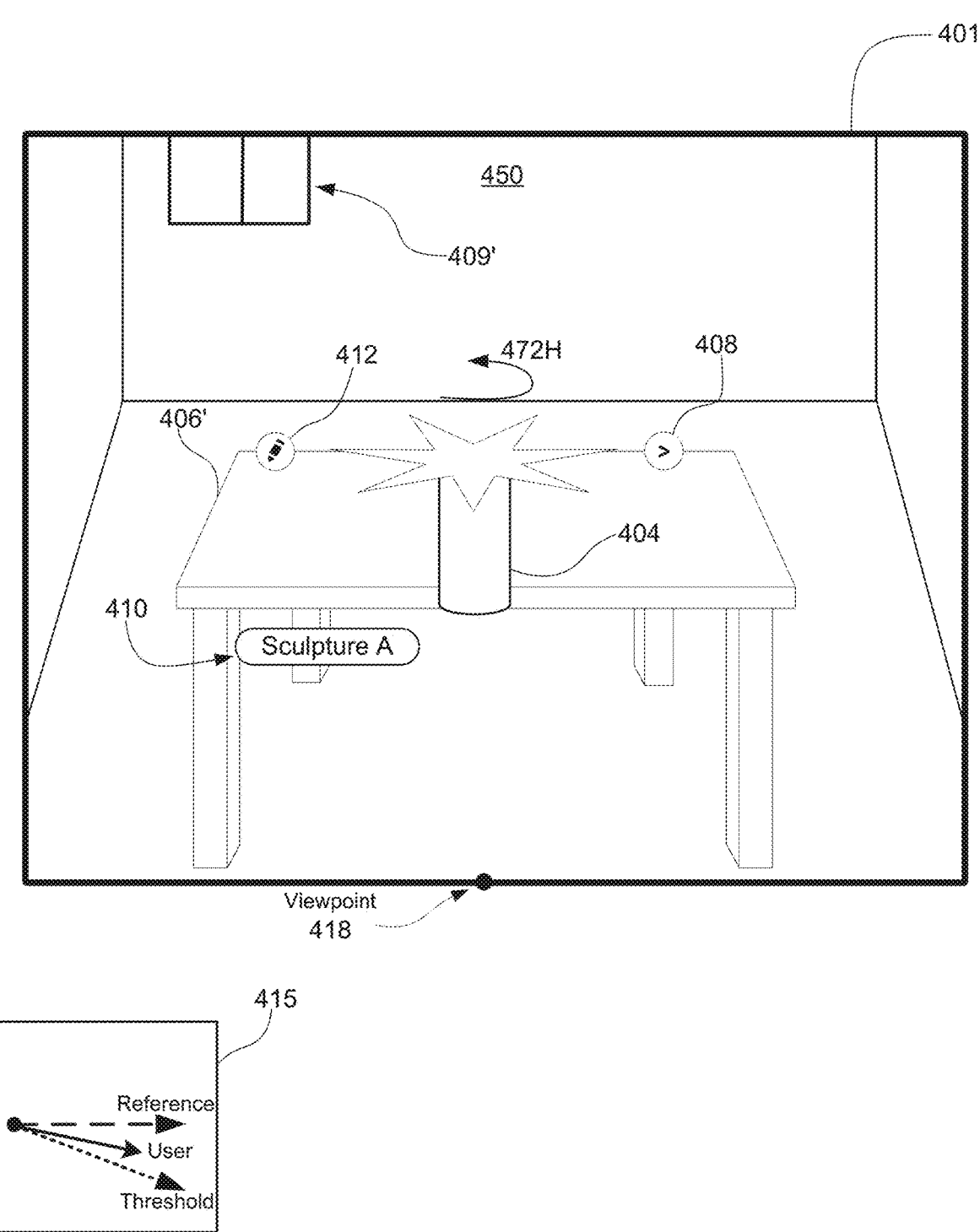

In some examples, as shown in FIG. 4H, when the movement of the viewpoint 418 of the user exceeds the movement threshold (e.g., the angular threshold) described above, the electronic device 401 redisplays the virtual object 404 in the tilt locked orientation in the three-dimensional environment 450. For example, as shown in FIG. 4H, when the viewpoint 418 of the user, illustrated by the user ray in the legend 415, is directed toward a location of the three-dimensional environment 450 that is above the angular threshold, illustrated by the threshold ray in the legend 415, relative to the reference ray intersecting the horizon of the field of view of the user, the electronic device 401 displays the virtual object 404 relative to the predefined portion of the user's tilt (e.g., the user's torso) in the three-dimensional environment 450. As shown in FIG. 4H and as similarly discussed above, the electronic device 401 presents the three-dimensional environment 450 based on the movement of the viewpoint 418 of the user. For example, as shown in FIG. 4H, the physical environment surrounding the electronic device 401 is shifted down in the field of view of the user, such that the greater portions of the walls of the physical environment are visible in the field of view than in FIG. 4G. Additionally, as shown in FIG. 4H, the representation of the table 406' is shifted down in the view of the three-dimensional environment 450 and a portion of the representation of the window 409' is presented based on the upward movement of the viewpoint 418.

As similarly discussed herein, in FIG. 4H, when the electronic device 401 redisplays the virtual object 404 in the tilt locked orientation in the three-dimensional environment 450, the one or more user interface elements are redisplayed relative to the predefined portion of the tilt of the user (e.g., the user's torso) from the viewpoint 418 of the user. For example, as previously discussed herein, the first user interface object 412, the second user interface object 408, and the virtual text label 410 may be displayed at unique positions in the three-dimensional environment 450 relative to a pole through the user's torso according to a polar coordinate system. Attention is now directed to exemplary interactions with the virtual object 404 in which the angular threshold is located above the reference ray intersecting the horizon of the field of view of the user.

Figure 4I:
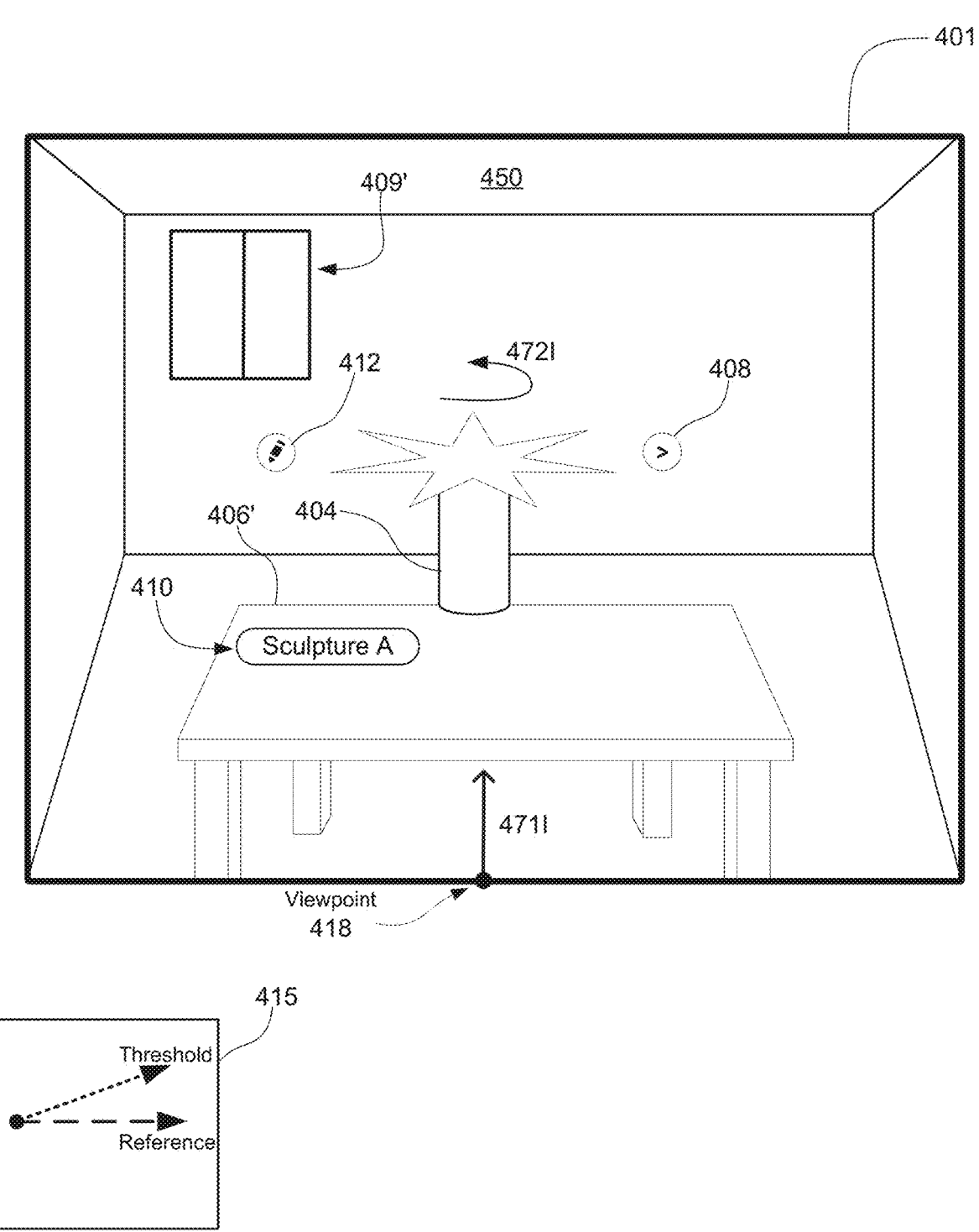

In FIG. 4I, the electronic device 401 is optionally displaying the virtual object 404 in the tilt locked orientation in the three-dimensional environment 450. In some examples, while the electronic device 401 is displaying the virtual object 404 in the tilt locked orientation in the three-dimensional environment 450, the electronic device 401 detects (e.g., radial) movement of the viewpoint 418 of the user relative to the three-dimensional environment 450. For example, as shown in FIG. 4I, the electronic device 401 is moved upward in the pitch direction, as represented by arrow 471I, in the physical environment surrounding the electronic device 401. In some examples, as similarly discussed herein, the radial movement of the viewpoint 418 corresponds to tilting of the head of the user wearing the electronic device 401 upward in the pitch direction.

As discussed above, in some examples, the electronic device 401 transitions from displaying the virtual object 404 in the tilt locked orientation to displaying the virtual object 404 in the head locked orientation if the movement of the viewpoint 418 exceeds a threshold movement. In some examples, as mentioned above, the threshold movement corresponds to an angular threshold. In some examples, as illustrated in the legend 415 in FIG. 4I, the angular threshold, represented by the threshold ray, may lie above the reference ray intersecting the horizon of the field of view of the user if the movement of the viewpoint 418 of the user is radially upward in the pitch direction rather than below it (e.g., for downward movement of the viewpoint 418, as shown previously in FIG. 4C). In some examples, the upward movement of the viewpoint 418 exceeds the threshold movement if the electronic device 401 detects upward movement of the viewpoint 418 beyond +10, 15, 20, 25, 30, 35, etc. degrees in the pitch direction relative to the reference ray (e.g., illustrated in the legend 415). In some examples, the threshold movement for upward movement of the viewpoint 418 is different from the threshold for downward movement of the viewpoint 418. For example, the angular threshold for upward movement of the viewpoint 418 in the pitch direction may be less than (e.g., +10, 15, 20, 25, 30, etc. degrees) the angular threshold for downward movement of the viewpoint 418 in the pitch direction (e.g., −20, 25, 30, 35, 40, etc. degrees).

Figure 4J:
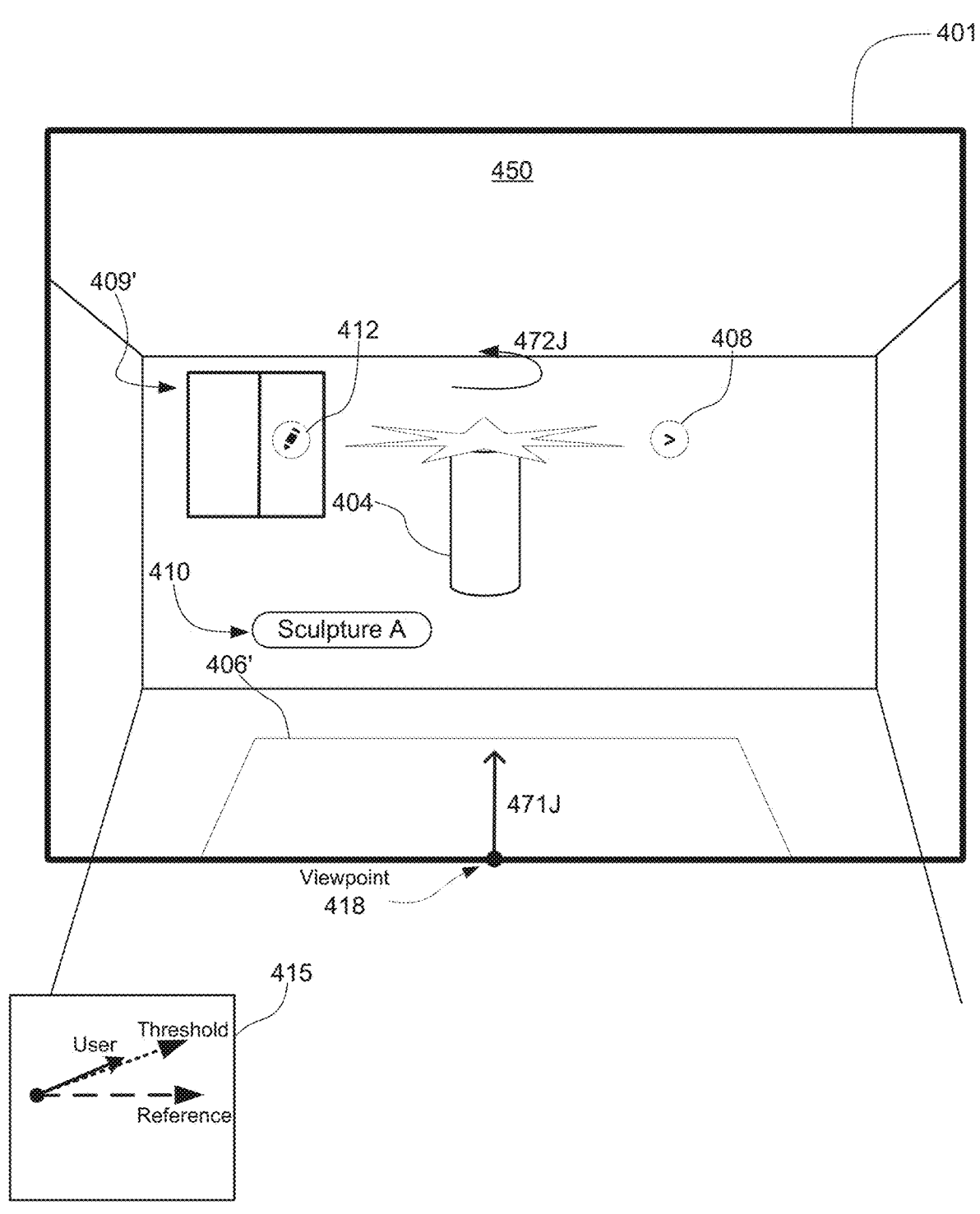

In some examples, in response to detecting the movement of the viewpoint 418 of the user upward in the pitch direction, the electronic device 401 updates presentation of the three-dimensional environment 450 based on the movement of the viewpoint 418, as shown in FIG. 4J and as similarly discussed above. Additionally, as shown in FIG. 4J, the electronic device 401 determines that the movement of the viewpoint 418 upward in the pitch direction exceeds the threshold movement discussed above. For example, as illustrated in the legend 415 in FIG. 4J, the user ray (e.g., representing the direction of the viewpoint 418 of the user) has crossed the threshold ray (e.g., representing the angular threshold discussed above) relative to the reference ray intersecting the horizon of the field of view of the user. In some examples, in response to detecting that the movement of the viewpoint 418 of the user exceeds the angular threshold, the electronic device 401 transitions from displaying the virtual object 404 in the tilt locked orientation to displaying the virtual object 404 in the head locked orientation in the three-dimensional environment 450. In some examples, as similarly described previously above, transitioning from displaying the virtual object 404 from tilt locked to head locked includes tilting/angling, translation, or a combination thereof, the virtual object 404 in the three-dimensional environment 450 relative to the viewpoint 418 of the user. For example, as shown in FIG. 4J, the electronic device 401 tilts/angles the virtual object 404 clockwise in the pitch direction in the three-dimensional environment 450 relative to the viewpoint 418 of the user. As shown in FIG. 4J, a greater portion of the side of the virtual object 404 is visible in the three-dimensional environment 450 from the viewpoint 418 of the user than in FIG. 4I.

As shown in FIG. 4J, in some examples, the electronic device 401 continues to rotate the virtual object 404 (e.g., in the yaw direction) about a vertical axis through the virtual object 404 relative to the viewpoint 418 of the user, as represented by arrow 472J. Additionally, as similarly discussed above, during the transition from displaying the virtual object 404 in the tilt locked orientation to displaying the virtual object 404 in the head locked orientation, the electronic device 401 maintains display of the one or more user interface elements relative to the predefined portion of the user (e.g., the user's torso) in the three-dimensional environment 450. For example, as shown in FIG. 4J, the first user interface object 412, the second user interface object 408, and the virtual text label 410 remain displayed according to a polar coordinate system relative to the user's torso in the three-dimensional environment 450. In some examples, the first user interface object 412, the second user interface object 408, and the virtual text label 410 are also transitioned to being displayed in the head locked orientation when the virtual object 404 is displayed in the head locked orientation in the three-dimensional environment 450.

Figure 4K:
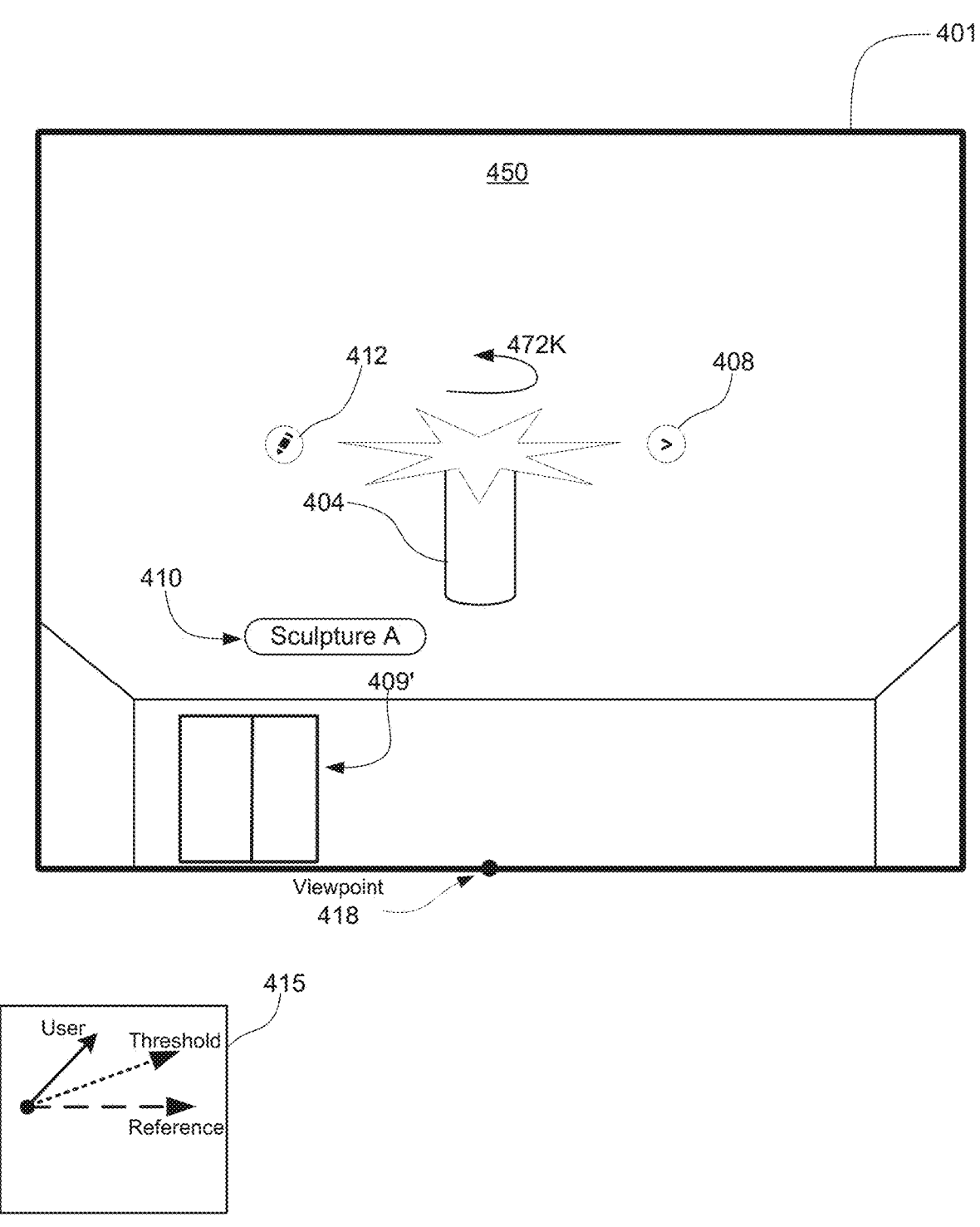

In FIG. 4J, when the viewpoint 418 of the user continues moving upward in the pitch direction, as indicated by the arrow 471J, the electronic device 401 displays the virtual object 404 in the head locked orientation, as shown in FIG. 4K. For example, as shown in FIG. 4K, when the electronic device 401 displays the virtual object 404 in the head locked orientation because the movement of the viewpoint 418 of the user has exceeded the threshold movement discussed above, as illustrated in the legend 415, the virtual object 404 is displayed relative to the head of the user in the three-dimensional environment 450. Additionally, as show in FIG. 4K, the electronic device 401 updates presentation of the three-dimensional environment 450 based on the upward movement of the viewpoint 418, as similarly discussed above. In some embodiments, as shown in FIG. 4K, the electronic device 401 continues to rotate the virtual object 404 about a vertical axis through the virtual object 404 in the three-dimensional environment 450 from the viewpoint 418 of the user.

In some examples, as similarly described above, when the electronic device 401 displays the virtual object 404 in the head locked orientation in the three-dimensional environment 450, the one or more user interface elements are displayed relative to the head of the user in the three-dimensional environment 450. For example, as previously discussed herein, the first user interface object 412, the second user interface object 408, and the virtual text label 410 are displayed at a fixed distance and orientation offset relative to the head of the user in the three-dimensional environment. As shown in FIG. 4K, because the virtual object 404 is displayed in the head locked orientation in the three-dimensional environment 450 as the user is looking up toward the ceiling of the physical environment in the field of view of the user, the one or more user interface elements do not obscure and/or distract from the virtual object 404 which would otherwise occur had the virtual object 404 been displayed in the tilt locked orientation, as previously discussed herein.

Accordingly, as discussed above, the user may continuously move/rotate their viewpoint 418 (e.g., by moving the electronic device 401) in the three-dimensional environment 450 with six degrees of freedom and the electronic device 401 may automatically transition between displaying the virtual object 404 in tilt locked and head locked based on whether the movement of the viewpoint 418 exceeds a movement threshold (e.g., an angular threshold relative to a reference ray intersecting the horizon of the field of view of the user). Thus, as described herein with reference to FIGS. 4A-4K, the disclosed method enables a user to, while a virtual object is displayed in a three-dimensional environment, to continuously view and/or interact with the virtual object irrespective of movement/rotation of a viewpoint of the user, as one advantage. Additionally, the disclosed method enables the virtual object to continuously be displayed in the three-dimensional environment without being obstructed by other user interface elements associated with the virtual object, which would otherwise hinder and/or distract from the user's ability to view and/or interact with the virtual object in the three-dimensional environment.

It should be understood that, in some examples, the above description of the one or more user interface elements being moved with the virtual object 404 in the three-dimensional environment 450 follows any suitable motion curve. For example, the first user interface object 412, the second user interface object 408, and the virtual text label 410 may be moved concurrently (e.g., in real time) with the virtual object 404 in the three-dimensional environment 450 in response to detecting the movement of the viewpoint 418 of the user. Alternatively, in some examples, the first user interface object 412, the second user interface object 408, and the virtual text label 410 may "lazy follow" the virtual object 404 when the virtual object 404 is moved in the three-dimensional environment 450 in response to detecting the movement of the viewpoint 418. For example, the one or more user interface elements follow a spring-based motion relationship with the virtual object 404, such that when the virtual object 404 is moved in the three-dimensional environment 450, the one or more user interface elements do not move until the virtual object 404 "pulls" the one or more user interface elements into motion according to the spring-based motion relationship.

It is understood that the examples shown and described herein are merely exemplary and that additional and/or alternative elements may be provided within the three-dimensional environment for interacting with the virtual objects and elements. It should be understood that the appearance, shape, form, and size of each of the various user interface elements and objects shown and described herein are exemplary and that alternative appearances, shapes, forms and/or sizes may be provided. For example, the virtual objects representative of application windows (e.g., application window 330) may be provided in an alternative shape than a rectangular shape, such as a circular shape, triangular shape, etc. In some examples, the various selectable affordances (e.g., first and second user interface objects 312/412 and 308/408) described herein may be selected verbally via user verbal commands (e.g., "select option" or "select virtual object" verbal command). Additionally or alternatively, in some examples, the various options, user interface elements, control elements, etc. described herein may be selected and/or manipulated via user input received via one or more separate input devices in communication with the electronic device(s). For example, selection input may be received via physical input devices, such as a mouse, trackpad, keyboard, etc. in communication with the electronic device(s).

FIG. 5 illustrates a flow diagram illustrating an example process for transitioning an object between tilt locked and head locked orientations in a three-dimensional environment according to some examples of the disclosure. In some examples, process 500 begins at an electronic device in communication with a display and one or more input devices. In some examples, the electronic device is optionally a head-mounted display similar or corresponding to device 201 of FIG. 2. As shown in FIG. 5, in some examples, at 502, the electronic device presents, via the display, a computer-generated environment including a first object, wherein the first object is displayed in a first manner in the computer-generated environment relative to a viewpoint of a user of the electronic device. For example, the electronic device (e.g., electronic device 401 in FIG. 4A) presents a three-dimensional environment, such as three-dimensional environment 450, that includes a virtual object displayed in a tilt locked orientation in the three-dimensional environment, such as virtual object 404 in FIG. 4A.

In some examples, at 504, while presenting the computer-generated environment including the first object that is displayed in the first manner, the electronic device detects, via the one or more input devices, a first input that includes movement of the viewpoint of the user. For example, the electronic device detects radial movement of the viewpoint of the user upward or downward in the pitch direction relative to the three-dimensional environment, such as the downward movement of the viewpoint 418 represented by arrow 471C in FIG. 4C. In some examples, at 506, in response to detecting the first input, at 508, the electronic device presents the first object in the computer-generated environment based on the movement of the viewpoint of the user. For example, as shown in FIG. 4D, the electronic device 401 presents the virtual object 404 such that the virtual object 404 remains centrally displayed in the field of view of the user after the downward movement of the viewpoint 418.

In some examples, at 510, in accordance with a determination that the movement of the viewpoint of the user exceeds a threshold movement, the electronic device displays, via the display, the first object in a second manner, different from the first manner, in the computer-generated environment relative to the viewpoint of the user. For example, as shown in FIG. 4F, if the downward movement of the viewpoint 418 of the user in the pitch direction exceeds an angular threshold relative to a reference ray intersecting the horizon of the field of view of the user, as illustrated in legend 415 in FIG. 4F, the electronic device displays the virtual object 404 in a head locked orientation in the three-dimensional environment 450. In some examples, at 512, in accordance with a determination that the movement of the viewpoint of the user does not exceed the threshold movement, the electronic device maintains display of the first object in the first manner in the computer-generated environment relative to the viewpoint of the user. For example, as shown in FIG. 4D, if the downward movement of the viewpoint 418 of the user in the pitch direction does not exceed the angular threshold relative to the reference ray intersecting the horizon of the field of view of the user, as illustrated in the legend 415 in FIG. 4D, the electronic device maintains display of the virtual object 404 in the tilt locked orientation in the three-dimensional environment 450.

It is understood that process 500 is an example and that more, fewer, or different operations can be performed in the same or in a different order. Additionally, the operations in process 500 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method, comprising, at an electronic device in communication with a display and one or more input devices: presenting, via the display, a computer-generated environment including a first object, wherein the first object is displayed in a first manner in the computer-generated environment relative to a viewpoint of a user of the electronic device; while presenting the computer-generated environment including the first object that is displayed in the first manner, detecting, via the one or more input devices, a first input that includes movement of the viewpoint of the user; and in response to detecting the first input, presenting the first object in the computer-generated environment based on the movement of the viewpoint of the user, including: in accordance with a determination that the movement of the viewpoint of the user exceeds a threshold movement, displaying, via the display, the first object in a second manner, different from the first manner, in the computer-generated environment relative to the viewpoint of the user; and in accordance with a determination that the movement of the viewpoint of the user does not exceed the threshold movement, maintaining display of the first object in the first manner in the computer-generated environment relative to the viewpoint of the user.

Additionally or alternatively, in some examples, the electronic device includes a head-mounted display. Additionally or alternatively, in some examples, the movement of the viewpoint of the user corresponds to movement of the head-mounted display. Additionally or alternatively, in some examples, displaying the first object in the first manner in the computer-generated environment includes displaying the first object at a first location in the computer-generated environment relative to a first predefined portion of the user according to a first coordinate system. Additionally or alternatively, in some examples, displaying the first object in the second manner in the computer-generated environment includes displaying the first object at a second location in the computer-generated environment relative to a second predefined portion, different from the first predefined portion, of the user according to a second coordinate system, different from the first coordinate system. Additionally or alternatively, in some examples, the determination that the movement of the viewpoint of the user exceeds the threshold movement is in accordance with a determination that a vertical component of the movement of the viewpoint of the user exceeds a threshold angle relative to a reference.

Additionally or alternatively, in some examples, the reference corresponds to a ray intersecting a horizon of a field of view of the user and normal to a force of gravity. Additionally or alternatively, in some examples, the vertical component of the movement of the viewpoint of the user corresponds to a radial upward or downward tilt of the viewpoint along a pitch direction relative to the ray. Additionally or alternatively, in some examples, before detecting the first input, the computer-generated environment further includes one or more user interface elements that are displayed concurrently with the first object. Additionally or alternatively, in some examples, the method further comprises, in response to detecting the first input, moving the one or more user interface elements with the first object in the computer-generated environment based on the movement of the viewpoint of the user. Additionally or alternatively, in some examples, before detecting the first input, the one or more user interface elements are displayed with a first orientation that is angled toward the viewpoint of the user, and the method further comprises, in response to detecting the first input, displaying, via the display, the one or more user interface elements with the first orientation that is angled toward the viewpoint of the user. Additionally or alternatively, in some examples, the method further comprises, in response to detecting the first input, in accordance with the determination that the movement of the viewpoint of the user does not exceed the threshold movement, displaying, via the display, the one or more user interface elements at one or more first locations in the computer-generated environment relative to a first predefined portion of the user according to a first coordinate system.

Additionally or alternatively, in some examples, the method further comprises, in response to detecting the first input, in accordance with the determination that the movement of the viewpoint of the user exceeds the threshold movement, displaying the one or more user interface elements at one or more second locations in the computer-generated environment relative to a second predefined portion, different from the first predefined portion, of the user according to a first coordinate system, different from the second coordinate system. Additionally or alternatively, in some examples, the method further comprises, while displaying the first object in the second manner in the computer-generated environment in accordance with the determination that the movement of the viewpoint exceeds the threshold movement in response to detecting the first input, detecting, via the one or more input devices, a second input that includes a second movement of the viewpoint of the user, and in response to detecting the second input, presenting the first object in the computer-generated environment based on the second movement of the viewpoint of the user. Additionally or alternatively, in some examples, presenting the first object in the computer-generated environment based on the second movement of the viewpoint of the user comprises, in accordance with a determination that the second movement of the viewpoint of the user exceeds a second threshold movement, redisplaying, via the display, the first object in the first manner in the computer-generated environment relative to the viewpoint of the user, and in accordance with a determination that the second movement of the viewpoint of the user does not exceed the second threshold movement, maintaining display of the first object in the second manner in the computer-generated environment relative to the viewpoint of the user.

Additionally or alternatively, in some examples, the method further comprises, while detecting the first input that includes the movement of the viewpoint of the user, in accordance with a determination that the movement of the viewpoint of the user exceeds the threshold movement, transitioning from displaying, via the display, the first object in the first manner to displaying the first object in the second manner in the computer-generated environment relative to the viewpoint of the user. Additionally or alternatively, in some examples, transitioning from displaying the first object in the first manner to displaying the first object in the second manner occurs over a predetermined range of angles of the movement of the viewpoint of the user. Additionally or alternatively, in some examples, before detecting the first input, the computer-generated environment further includes a second object that is displayed in a third manner, different from the first manner and the second manner, in the computer-generated environment relative to the viewpoint of the user. Additionally or alternatively, in some examples, the method further comprises, in response to detecting the first input: forgoing moving the second object in the computer-generated environment based on the movement of the viewpoint of the user; and maintaining display, via the display, of the second object in the third manner in the computer-generated environment relative to the viewpoint of the user.

Some examples of the disclosure are directed to an electronic device, comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising one or more processors, memory, and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:
at an electronic device in communication with a display and one or more input devices:
   presenting, via the display, a three-dimensional environment including a first object, wherein the first object is displayed in a first manner in the three-dimensional environment relative to a viewpoint of a user of the electronic device, wherein displaying the first object in the first manner in the three-dimensional environment includes displaying the first object in a tilt locked orientation in the three-dimensional environment;
   while presenting the three-dimensional environment including the first object that is displayed in the first manner, detecting, via the one or more input devices, a first input that includes movement of the viewpoint of the user; and
   in response to detecting the first input:
      moving the first object in the three-dimensional environment as the movement of the viewpoint of the user is detected, including:
         in accordance with a determination that the movement of the viewpoint of the user exceeds a threshold movement, displaying, via the display, the first object in a second manner, different from the first manner, in the three-dimensional environment relative to the viewpoint of the user, wherein displaying the first object in the second manner in the three-dimensional environment includes displaying the first object in a head locked orientation in the three-dimensional environment; and
         in accordance with a determination that the movement of the viewpoint of the user does not exceed the threshold movement, maintaining display of the first object in the first manner in the three-dimensional environment relative to the viewpoint of the user.

2. The method of claim 1, wherein the determination that the movement of the viewpoint of the user exceeds the threshold movement is in accordance with a determination that a vertical component of the movement of the viewpoint of the user exceeds a threshold angle relative to a ray intersecting a horizon of a field of view of the user and normal to a force of gravity.

3. The method of claim 1, wherein, before detecting the first input, the three-dimensional environment further includes one or more user interface elements that are displayed concurrently with the first object, the method further comprising:
in response to detecting the first input:
   moving the one or more user interface elements with the first object in the three-dimensional environment based on the movement of the viewpoint of the user.

4. The method of claim 3, further comprising:
in response to detecting the first input:
   in accordance with the determination that the movement of the viewpoint of the user does not exceed the threshold movement, displaying, via the display, the one or more user interface elements in a tilt locked orientation in the three-dimensional environment; and
   in accordance with the determination that the movement of the viewpoint of the user exceeds the threshold movement, displaying the one or more user interface elements in a head locked orientation in the three-dimensional environment.

5. The method of claim 1, further comprising:
while displaying the first object in the second manner in the three-dimensional environment in accordance with the determination that the movement of the viewpoint exceeds the threshold movement in response to detecting the first input, detecting, via the one or more input devices, a second input that includes a second movement of the viewpoint of the user; and
in response to detecting the second input:
in accordance with a determination that the second movement of the viewpoint of the user exceeds a second threshold movement, redisplaying, via the display, the first object in the first manner in the three-dimensional environment relative to the viewpoint of the user; and
in accordance with a determination that the second movement of the viewpoint of the user does not exceed the second threshold movement, maintaining display of the first object in the second manner in the three-dimensional environment relative to the viewpoint of the user.

6. The method of claim 1, further comprising:
while detecting the first input that includes the movement of the viewpoint of the user:
in accordance with a determination that the movement of the viewpoint of the user exceeds the threshold movement, transitioning from displaying, via the display, the first object in the first manner to displaying the first object in the second manner in the three-dimensional environment relative to the viewpoint of the user.

7. The method of claim 1, wherein, before detecting the first input, the three-dimensional environment further includes a second object that is displayed in a third manner, different from the first manner and the second manner, in the three-dimensional environment relative to the viewpoint of the user, the method further comprising:
in response to detecting the first input:
forgoing moving the second object in the three-dimensional environment based on the movement of the viewpoint of the user; and
maintaining display, via the display, of the second object in the third manner in the three-dimensional environment relative to the viewpoint of the user.

8. An electronic device comprising:
one or more processors;
memory; and
one or more programs stored in the memory and configured to be executed by the one or more processors, the one or more programs including instructions for performing a method comprising:
presenting, via a display, a three-dimensional environment including a first object, wherein the first object is displayed in a first manner in the three-dimensional environment relative to a viewpoint of a user of the electronic device, wherein displaying the first object in the first manner in the three-dimensional environment includes displaying the first object in a tilt locked orientation in the three-dimensional environment;
while presenting the three-dimensional environment including the first object that is displayed in the first manner, detecting, via one or more input devices, a first input that includes movement of the viewpoint of the user; and in response to detecting the first input:
moving the first object in the three-dimensional environment as the movement of the viewpoint of the user is detected, including:
in accordance with a determination that the movement of the viewpoint of the user exceeds a threshold movement, displaying, via the display, the first object in a second manner, different from the first manner, in the three-dimensional environment relative to the viewpoint of the user, wherein displaying the first object in the second manner in the three-dimensional environment includes displaying the first object in a head locked orientation in the three-dimensional environment; and
in accordance with a determination that the movement of the viewpoint of the user does not exceed the threshold movement, maintaining display of the first object in the first manner in the three-dimensional environment relative to the viewpoint of the user.

9. The electronic device of claim 8, wherein the determination that the movement of the viewpoint of the user exceeds the threshold movement is in accordance with a determination that a vertical component of the movement of the viewpoint of the user exceeds a threshold angle relative to a ray intersecting a horizon of a field of view of the user and normal to a force of gravity.

10. The electronic device of claim 8, wherein, before detecting the first input, the three-dimensional environment further includes one or more user interface elements that are displayed concurrently with the first object, and the method further comprises:
in response to detecting the first input:
moving the one or more user interface elements with the first object in the three-dimensional environment based on the movement of the viewpoint of the user.

11. The electronic device of claim 10, wherein the method further comprises:
in response to detecting the first input:
in accordance with the determination that the movement of the viewpoint of the user does not exceed the threshold movement, displaying, via the display, the one or more user interface elements in a tilt locked orientation in the three-dimensional environment; and
in accordance with the determination that the movement of the viewpoint of the user exceeds the threshold movement, displaying the one or more user interface elements in a head locked orientation in the three-dimensional environment.

12. The electronic device of claim 8, wherein the method further comprises:
while displaying the first object in the second manner in the three-dimensional environment in accordance with the determination that the movement of the viewpoint exceeds the threshold movement in response to detecting the first input, detecting, via the one or more input devices, a second input that includes a second movement of the viewpoint of the user; and
in response to detecting the second input:
in accordance with a determination that the second movement of the viewpoint of the user exceeds a second threshold movement, redisplaying, via the display, the first object in the first manner in the three-dimensional environment relative to the viewpoint of the user; and in accordance with a determination that the second movement of the viewpoint of the user does not exceed the second threshold movement, maintaining display of the first object in the second manner in the three-dimensional environment relative to the viewpoint of the user.

13. The electronic device of claim 8, wherein the method further comprises:

while detecting the first input that includes the movement of the viewpoint of the user:

in accordance with a determination that the movement of the viewpoint of the user exceeds the threshold movement, transitioning from displaying, via the display, the first object in the first manner to displaying the first object in the second manner in the three-dimensional environment relative to the viewpoint of the user.

14. The electronic device of claim 8, wherein, before detecting the first input, the three-dimensional environment further includes a second object that is displayed in a third manner, different from the first manner and the second manner, in the three-dimensional environment relative to the viewpoint of the user, and the method further comprises:

in response to detecting the first input:

forgoing moving the second object in the three-dimensional environment based on the movement of the viewpoint of the user; and maintaining display, via the display, of the second object in the third manner in the three-dimensional environment relative to the viewpoint of the user.

15. A non-transitory computer readable storage medium storing one or more programs, the one or more programs comprising instructions, which when executed by one or more processors of an electronic device, cause the electronic device to perform a method comprising:

presenting, via a display, a three-dimensional environment including a first object, wherein the first object is displayed in a first manner in the three-dimensional environment relative to a viewpoint of a user of the electronic device, wherein displaying the first object in the first manner in the three-dimensional environment includes displaying the first object in a tilt locked orientation in the three-dimensional environment;

while presenting the three-dimensional environment including the first object that is displayed in the first manner, detecting, via one or more input devices, a first input that includes movement of the viewpoint of the user; and in response to detecting the first input:

moving the first object in the three-dimensional environment as the movement of the viewpoint of the user is detected, including:

in accordance with a determination that the movement of the viewpoint of the user exceeds a threshold movement, displaying, via the display, the first object in a second manner, different from the first manner, in the three-dimensional environment relative to the viewpoint of the user, wherein displaying the first object in the second manner in the three-dimensional environment includes displaying the first object in a head-locked orientation in the three-dimensional environment; and in accordance with a determination that the movement of the viewpoint of the user does not exceed the threshold movement, maintaining display of the first object in the first manner in the three-dimensional environment relative to the viewpoint of the user.

16. The non-transitory computer readable storage medium of claim 15, wherein the determination that the movement of the viewpoint of the user exceeds the threshold movement is in accordance with a determination that a vertical component of the movement of the viewpoint of the user exceeds a threshold angle relative to a ray intersecting a horizon of a field of view of the user and normal to a force of gravity.

17. The non-transitory computer readable storage medium of claim 15, wherein, before detecting the first input, the three-dimensional environment further includes one or more user interface elements that are displayed concurrently with the first object, and the method further comprises:

in response to detecting the first input:

moving the one or more user interface elements with the first object in the three-dimensional environment based on the movement of the viewpoint of the user.

18. The non-transitory computer readable storage medium of claim 17, wherein the method further comprises:

in response to detecting the first input:

in accordance with the determination that the movement of the viewpoint of the user does not exceed the threshold movement, displaying, via the display, the one or more user interface elements in a tilt locked orientation in the three-dimensional environment; and in accordance with the determination that the movement of the viewpoint of the user exceeds the threshold movement, displaying the one or more user interface elements in a head locked orientation in the three-dimensional environment.

19. The non-transitory computer readable storage medium of claim 15, wherein the method further comprises:

while displaying the first object in the second manner in the three-dimensional environment in accordance with the determination that the movement of the viewpoint exceeds the threshold movement in response to detecting the first input, detecting, via the one or more input devices, a second input that includes a second movement of the viewpoint of the user; and in response to detecting the second input:

in accordance with a determination that the second movement of the viewpoint of the user exceeds a second threshold movement, redisplaying, via the display, the first object in the first manner in the three-dimensional environment relative to the viewpoint of the user; and in accordance with a determination that the second movement of the viewpoint of the user does not exceed the second threshold movement, maintaining display of the first object in the second manner in the three-dimensional environment relative to the viewpoint of the user.

20. The non-transitory computer readable storage medium of claim 15, wherein the method further comprises:

while detecting the first input that includes the movement of the viewpoint of the user:

in accordance with a determination that the movement of the viewpoint of the user exceeds the threshold movement, transitioning from displaying, via the display, the first object in the first manner to displaying the first object in the second manner in the three-dimensional environment relative to the viewpoint of the user.

21. The non-transitory computer readable storage medium of claim 15, wherein, before detecting the first input, the three-dimensional environment further includes a second object that is displayed in a third manner, different from the first manner and the second manner, in the three-dimensional environment relative to the viewpoint of the user, and the method further comprises:

in response to detecting the first input:

forgoing moving the second object in the three-dimensional environment based on the movement of the viewpoint of the user; and maintaining display, via the display, of the second object in the third manner in the three-dimensional environment relative to the viewpoint of the user.

22. The method of claim 2, wherein the vertical component of the movement of the viewpoint of the user corresponds to a radial upward or downward tilt of the viewpoint along a pitch direction relative to the ray.

23. The electronic device of claim 9, wherein the vertical component of the movement of the viewpoint of the user corresponds to a radial upward or downward tilt of the viewpoint along a pitch direction relative to the ray.

24. The non-transitory computer readable storage medium of claim 16, wherein the vertical component of the movement of the viewpoint of the user corresponds to a radial upward or downward tilt of the viewpoint along a pitch direction relative to the ray.

\* \* \* \* \*